US010230427B2

(12) United States Patent
Kahn

(10) Patent No.: US 10,230,427 B2
(45) Date of Patent: Mar. 12, 2019

(54) SYSTEMS AND METHODS FOR DC POWER LINE COMMUNICATION IN A PHOTOVOLTAIC SYSTEM

(71) Applicant: Maxim Integrated Products, Inc., San Jose, CA (US)

(72) Inventor: Seth M. Kahn, San Francisco, CA (US)

(73) Assignee: Maxim Integrated Products, Inc., San Jose, CA (US)

( * ) Notice: Subject to any disclaimer, the term of this patent is extended or adjusted under 35 U.S.C. 154(b) by 0 days.

(21) Appl. No.: 15/209,124

(22) Filed: Jul. 13, 2016

(65) Prior Publication Data
US 2017/0019151 A1 Jan. 19, 2017

Related U.S. Application Data

(60) Provisional application No. 62/191,945, filed on Jul. 13, 2015.

(51) Int. Cl.
*H04B 3/00* (2006.01)
*H04L 25/00* (2006.01)
*H04B 3/54* (2006.01)

(52) U.S. Cl.
CPC ............ *H04B 3/542* (2013.01); *H04B 3/548* (2013.01); *H04B 2203/547* (2013.01); *H04B 2203/5412* (2013.01)

(58) Field of Classification Search
None
See application file for complete search history.

(56) References Cited

U.S. PATENT DOCUMENTS

| 7,068,017 B2 | 6/2006 | Willner et al. |
| 7,719,140 B2 | 5/2010 | Ledenev et al. |
| 8,013,472 B2 | 9/2011 | Adest et al. |
| 8,035,249 B2 | 10/2011 | Shaver, II et al. |

(Continued)

FOREIGN PATENT DOCUMENTS

| WO | 2011019936 A1 | 2/2011 |
| WO | 2012109426 A2 | 8/2012 |
| WO | 2014080337 A2 | 5/2014 |

OTHER PUBLICATIONS

International Search Report and Written Opinion corresponding to International Patent Application No. PCT/US2016/042042, dated Oct. 27, 2016, 7 pages.

(Continued)

*Primary Examiner* — Chieh M Fan
*Assistant Examiner* — Gina McKie
(74) *Attorney, Agent, or Firm* — Lathrop Gage LLP

(57) ABSTRACT

A method for direct current power line communication in a photovoltaic system includes (a) transferring power between a photovoltaic device and a load using a power line, (b) detecting a change in operation of the power line, and (c) in response to the detected change in operation of the power line, decoding operating state of the power line to obtain information. A method for direct current power line communication in a photovoltaic system includes (a) transferring power between a photovoltaic device and a load using a power line, (b) changing operation of the power line, and (c) encoding operating state of the power line to represent information to be communicated.

23 Claims, 18 Drawing Sheets

(56) References Cited

U.S. PATENT DOCUMENTS

| | | |
|---|---|---|
| 8,044,648 B1 | 10/2011 | Kahn et al. |
| 8,274,172 B2 | 9/2012 | Hadar et al. |
| 8,427,009 B2 | 4/2013 | Shaver, II et al. |
| 8,531,055 B2 | 9/2013 | Adest et al. |
| 8,587,151 B2 | 11/2013 | Adest et al. |
| 8,669,675 B2 | 3/2014 | Capp et al. |
| 8,751,053 B2 * | 6/2014 | Hadar .................. H02J 13/002 307/80 |
| 8,816,535 B2 | 8/2014 | Adest et al. |
| 8,872,384 B2 | 10/2014 | Stratakos et al. |
| 8,947,194 B2 | 2/2015 | Sella et al. |
| 8,970,057 B2 * | 3/2015 | Li ......................... F03D 9/255 290/44 |
| 9,035,626 B2 | 5/2015 | Stratakos et al. |
| 9,112,379 B2 | 8/2015 | Sella et al. |
| 9,401,599 B2 | 7/2016 | Har-Shai et al. |
| 9,438,035 B2 | 9/2016 | Capp et al. |
| 9,590,526 B2 | 3/2017 | Adest et al. |
| 9,620,956 B2 | 4/2017 | Jankowski |
| 2003/0234038 A1 | 12/2003 | Kurokami et al. |
| 2010/0259931 A1 * | 10/2010 | Chemel .................... F21S 8/08 362/249.02 |
| 2010/0301991 A1 * | 12/2010 | Sella .................. G08B 13/1409 340/3.1 |
| 2011/0067750 A1 * | 3/2011 | Ueda ........................ F24J 2/38 136/246 |
| 2012/0326512 A1 | 12/2012 | Yokoyama et al. |
| 2013/0009483 A1 | 1/2013 | Kawate et al. |
| 2015/0381108 A1 | 12/2015 | Hoft et al. |
| 2016/0006392 A1 | 1/2016 | Hoft |
| 2016/0246320 A1 | 8/2016 | Chang et al. |
| 2016/0308365 A1 * | 10/2016 | Mayer ..................... H02J 3/383 |

OTHER PUBLICATIONS

Non-Final Rejection in U.S. Appl. No. 15/433,958 dated Mar. 7, 2018, 13 pp.

* cited by examiner

SYSTEMS AND METHODS FOR DC POWER LINE COMMUNICATION IN A PHOTOVOLTAIC SYSTEM

RELATED APPLICATIONS

This application claims benefit of priority to U.S. Provisional Patent Application Ser. No. 62/191,945, filed Jul. 13, 2015, which is incorporated herein by reference.

BACKGROUND

Photovoltaic cells are often used to recharge batteries, or to provide power to an electric grid and/or a building through an inverter. Photovoltaic cells often, however, provide less output power than expected from known device efficiency and illumination.

One reason that photovoltaic cells may deliver less than optimum power is that their maximum power output under typical conditions is often at a voltage that is not well matched to their load. This mismatch occurs, in part, because typical photovoltaic cells are temperature sensitive, and a sufficient quantity of photovoltaic cells must be connected in series to provide required voltage magnitude at high temperatures. This large photovoltaic cell count becomes excessive at low temperatures where photovoltaic cells' maximum power output voltage is highest. Similarly, maximum power output voltage may change with illumination changes. Other losses occur when any one series-connected photovoltaic cell in a module of interconnected photovoltaic cells ("photovoltaic module") generates less current than other photovoltaic cells in the photovoltaic module. Barring additional circuitry, the output current of a series string of photovoltaic cells is effectively limited by photocurrent produced in the weakest, or most shaded, cell.

Since shading affects photocurrent produced in photovoltaic cells, often limiting current production of a series string of cells to that of a most-shaded cell of the string, un-shaded cells in the same series string may yield substantially less power than they are otherwise capable of. Further, shading of cells may vary with time of day, sun angle, obstruction position, and even the position of wind-blown leaves or other debris on a photovoltaic panel.

Maximum Power Point Tracking (MPPT) controllers are frequently connected between a photovoltaic module and a load, such as an inverter or a battery. MPPT controllers typically include a switching circuit, such as a buck DC-to-DC converter, that converts an input power at a module voltage to an output power for the load at a load voltage, and control circuitry that seeks to find a module voltage at which the photovoltaic module produces maximum power. The switching circuit of the MPPT controller serves to decouple the photovoltaic module and load voltages. Some examples of MPPT controllers and associated systems and methods are discussed in U.S. Patent Application Publication Nos. 2012/0043818, 2012/0043823, and 2012/0044014 to Stratakos et al., which are incorporated herein by reference.

Many photovoltaic system applications require communication between system components. For example, safety requirements may necessitate that MPPT controllers be capable of being remotely disabled. As another example, MPPT controllers may need to communicate status information to a central device for photovoltaic system monitoring. Accordingly, conventional MPPT controllers are frequently capable of communicating with a remote device using radio frequency ("RF") networking or power line communication ("PLC") networking. Both RF and PLC networking systems transmit data by generating a high frequency carrier wave, modulating the carrier wave, transmitting the carrier wave over a medium, and demodulating the carrier wave. Consequentially, RF and PLC networking systems require high frequency transceivers, as well as modulating and demodulating equipment. The transmission medium in RF networking systems is typically air, while the transmission medium in PLC networking systems is a power line. It is important to note that PLC networking operates on top of power delivery and distribution across a power line, and PLC networking typically does not disturb power delivery through the power line.

SUMMARY

In an embodiment, a method for direct current power line communication in a photovoltaic system includes (a) transferring power between a photovoltaic device and a load using a power line, (b) detecting a change in operation of the power line, and (c) in response to the detected change in operation of the power line, decoding operating state of the power line to obtain information.

In an embodiment, a method for direct current power line communication in a photovoltaic system includes (a) transferring power between a photovoltaic device and a load using a power line, (b) changing operation of the power line, and (c) encoding operating state of the power line to represent information to be communicated.

In an embodiment, a communication controller for direct current power line communication in a photovoltaic system includes (a) a detecting module configured to detect a change in operation of the power line and (b) a decoding module configured to, in response to the change in operation of the power line detected by the detecting module, decode operating state of the power line to obtain information.

In an embodiment, a communication controller for direct current power line communication in a photovoltaic system includes (a) a switching device for electrically coupling to the power line and (b) a pulse control module configured to: (1) cause the switching device to change operating states and thereby change operation of the power line and (2) cause the switching device to switch to encode operating state of the power line to represent information to be communicated.

DETAILED DESCRIPTION OF THE EMBODIMENTS

Applicant has developed systems and methods for direct current (DC) power line communication in photovoltaic systems. The systems and methods repurpose a system power line for communication, thereby potentially eliminating the need for high-frequency transceivers and associated components that are required when using conventional RF and PLC communication techniques. Accordingly, the disclosed systems and methods potentially significantly simplify photovoltaic system communication relative to conventional techniques.

Figure 1:
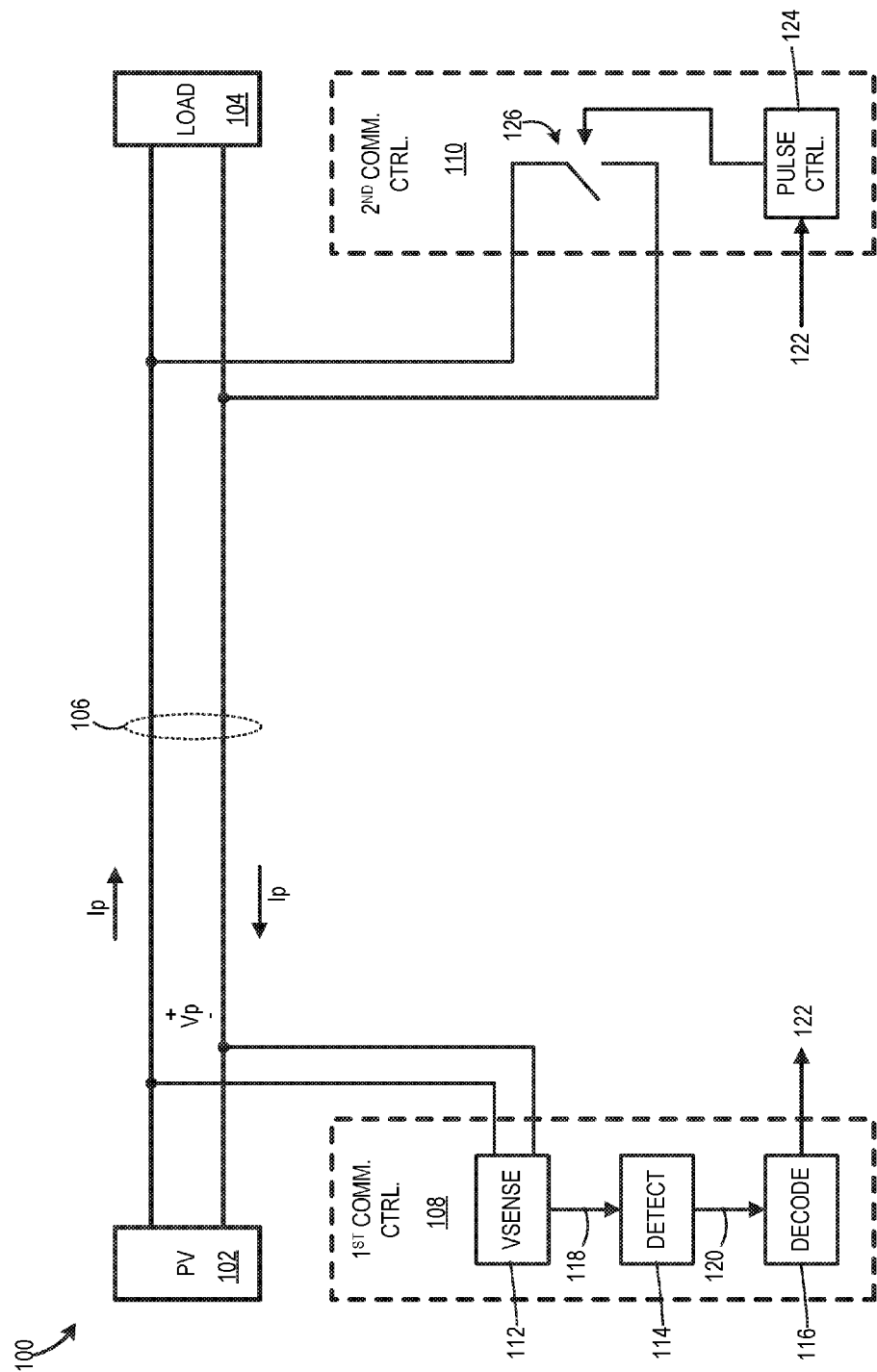
FIG. 1 illustrates a photovoltaic system capable of DC power line communication by changing operation of a power line in the voltage domain, according to an embodiment.

FIG. 1 illustrates a photovoltaic system 100 capable of DC power line communication by changing operation of a power line in the voltage domain. Photovoltaic system 100 includes a photovoltaic device 102 electrically coupled to a load 104 via a power line 106. The term "photovoltaic device" in this document means one or more electrically-coupled photovoltaic cells, such as a single-junction photovoltaic cell, a multi junction photovoltaic cell, a photovoltaic module of interconnected photovoltaic cells, or a panel of multiple interconnected photovoltaic modules. Load 104 is, for example, an inverter for transforming DC power from photovoltaic device 102 to AC power. Load 104 could take other forms, however, without departing from the scope hereof.

Photovoltaic system 100 further includes a first communication controller 108 and a second communication controller 110 each electrically coupled to power line 106. First communication controller 108 includes a voltage sensing module 112, a detecting module 114, and decoding module 116. Voltage sensing module 112 generates a voltage signal 118 representing voltage Vp on power line 106. In some embodiments, voltage sensing module 112 is simply an electrical tap across power line 106, such that voltage signal 118 is the same as voltage Vp on power line 106. In some other embodiments, voltage sensing module 112 includes electronic circuitry, such as amplification circuitry, level-shifting circuitry, scaling circuitry, and/or analog-to-digital conversion circuitry, which generates voltage signal 118, so that voltage signal 118 represents, but is not necessarily the same as, voltage Vp. Voltage signal 118 is either an analog signal or a digital signal, depending on the implementation of voltage sensing module 112.

Detecting module 114 detects a change in operation of power line 106 in the voltage domain. Specifically, detecting module 114 monitors voltage signal 118 and generates a change signal 120 representing a change in operation of power line 106, in response to voltage Vp dropping below a threshold value. In some embodiments, detecting module 114 compares only a DC component of voltage Vp to the threshold value. Additionally, in some embodiments, detecting module 114 is disabled during start-up and/or shut down of photovoltaic system 100, to avoid false detection of events associated with system start-up or shutdown. Detecting module 114 is at least partially implemented, in some embodiments, by digital and/or analog circuitry, such as comparison circuitry which compares voltage signal 118 to a reference signal representing the threshold value. Alternately or additionally, detecting module 114 is at least partially implemented by a processor executing instructions in the form of software or firmware stored in a memory, to perform the functions of detecting module 114. Change signal 120 is either an analog signal or a digital signal, depending on the implementation of detecting module 114.

Decoding module 116 decodes operating state of power line 106 to obtain transmitted information. Specifically, decoding module 116 decodes logic and/or timing of one or more voltage pulses on power line 106 to obtain information 122 transmitted from second communication controller 110 to first communication controller 108, in response to assertion of change signal 120. For example, in some embodiments, decoding module 116 obtains information 122 based on the following: (1) a number of pulses on power line 106 within a particular time frame, (2) widths of one or more pulses on power line 106, (3) frequency of pulses on power line 106, and/or (4) a pattern of pulses on power line 106. In some embodiments, decoding module 116 is at least partially implemented by electronic circuitry, such as pulse detection and counting circuitry, which detects pulses on change signal 120 and their associated timing. Decoding module 116 is alternately or additionally implemented at least in part by a processor executing instructions in the form of software or firmware stored in a memory, to perform the functions of decoding module 116. Information 122 is either in analog or digital form, depending on the implementation of decoding module 116.

Although modules 112, 114, 116 of first communication controller 108 are illustrated as discrete elements, one or more of these modules may be partially or completely combined without departing from the scope hereof. For example, in a particular embodiment, detecting module 114 and decoding module 116 are implemented by a common processor executing instructions, in the form of firmware or software, stored in a memory.

Second communication controller 110 includes a pulse control module 124 and a switching device 126 electrically coupled across power line 106. In the context of this document, the term "switching device" refers to a device which can be controlled to switch between conductive and non-conductive states, including, but not limited to, a field effect transistor, a bipolar junction transistor, or an insulated gate bipolar transistor. Pulse control module 124 receives information 122 to be communicated to first communication controller 108, and pulse control module 124 encodes operating state of power line 106 to represent information 122 by controlling switching device 126 to vary operation of power line 106 in the voltage domain.

In particular, pulse control module 124 causes switching device 126 to operate in its non-conductive state under normal operation of photovoltaic system 100, i.e., when power line 106 is not transmitting information. However, upon receipt of information 122, pulse control module 124 causes switching device 126 to switch from its non-conductive state to its conductive state, thereby shunting power line 106 and changing operation of power line 106 in the voltage domain. Such shunting of power line 106 causes voltage Vp to significantly drop, such as to near zero, so that Vp is outside of an expected normal operating range. Pulse control module 124 causes switching device 126 to remain in its conductive state for a predetermined period of time, thereby generating a voltage pulse on power line 106 at least partially representing information 122. In some embodiments, pulse control module 124 is adapted to control switching device 126 to generate several voltage pulses on power line 106 in response to information 122, such as to serially transmit several bits of information representing information 122 and/or communication protocols. In some other embodiments, pulse control module 124 is adapted to control switching device 126 to remain in its conductive state indefinitely in response to information 122, thereby generating a voltage pulse on power line 106 having an indefinite width.

Although pulse control module 124 and switching device 126 are illustrated as discrete elements, these elements may be partially or completely combined without departing from the scope hereof. Pulse control module 124 may be implemented by hardware, by a processor executing instructions in the form of software or firmware stored in a memory, or a combination thereof. For example, in a particular embodiment, pulse control module 124 includes pulse detection circuitry which detects information 122 in the form of one or more pulses on an input signal to pulse control module 124, as well as circuitry which causes switching device 126 to operate in its conductive state for a predetermined amount of time in response to each detected pulse of information 122. As another example, in a particular embodiment, pulse control module 124 includes a processor executing instructions, in the form of software or firmware stored in a memory, which control switching of switching device 126 in a predetermined manner in response to information 122, thereby encoding information 122 in the form of voltage pulses on power line 106.

Additionally, although switching device 126 is illustrated as directly coupled across power line 106, in some alternate embodiments, one or more additional electrical components, such as resistors and/or capacitors, are electrically coupled in series with switching device 126. In these alternate embodiments, switching device 126 switches the additional electrical components in/out of a circuit including power line 106 to change operation of power line 106.

Figure 2:
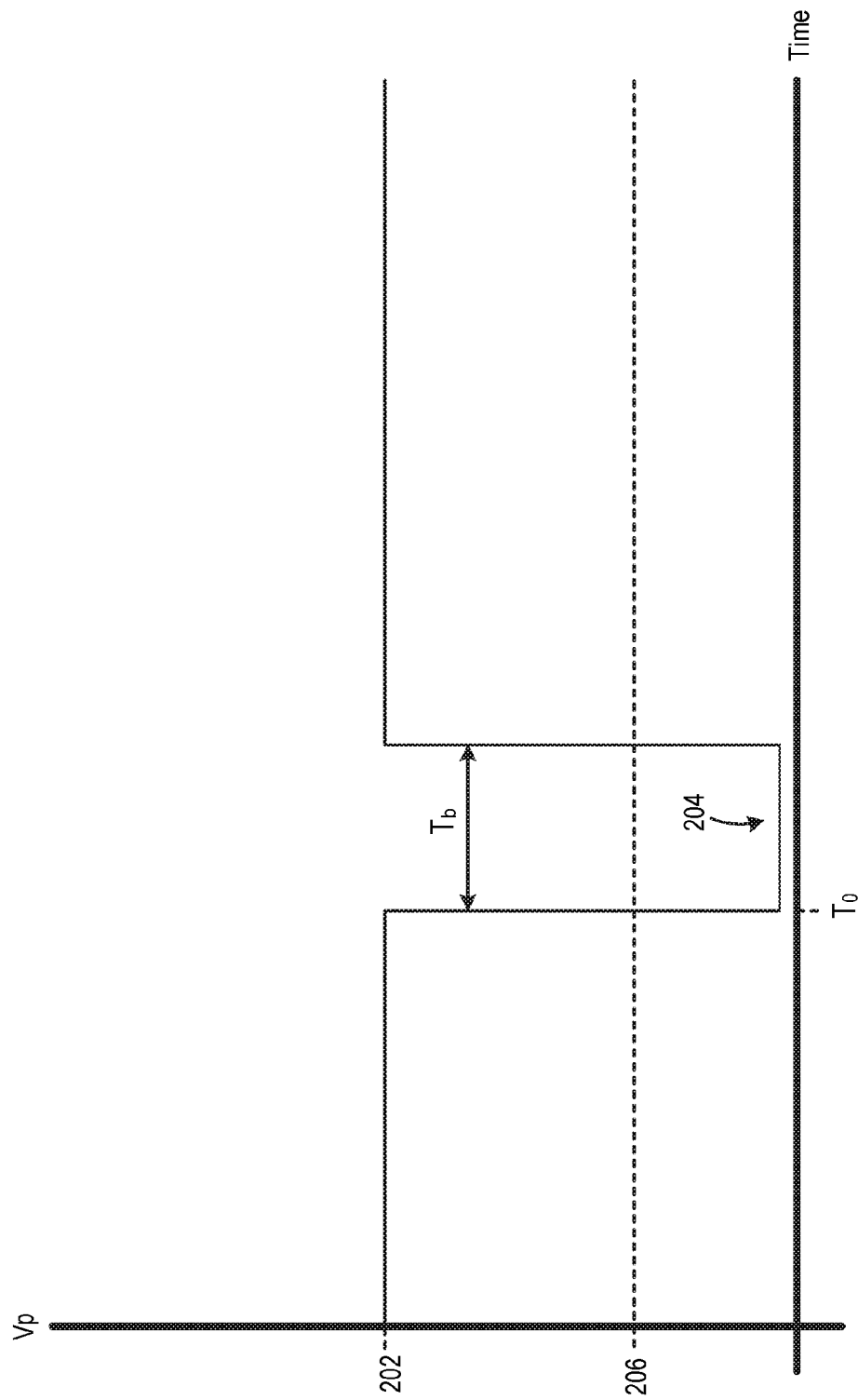
FIG. 2 illustrates one example of the FIG. 1 system transmitting information across a power line in a single pulse, according to an embodiment.

FIG. 2 illustrates one example of system 100 transmitting information across power line 106 in a single pulse. Prior to time $T_0$, voltage Vp on power line 106 has value 202 which is, for example, a maximum power point voltage of photovoltaic device 102. At time $T_0$, pulse control module 124 causes switching device 126 to switch from its non-conductive state to its conductive state in response to receipt of information 122. Consequentially, voltage Vp drops from value 202 to near zero at time $T_0$. Pulse control module 124 causes switching device 126 to remain in its conductive state for period $T_b$ to generate a voltage pulse 204 on power line 106, where voltage pulse 204 represents information 122.

Voltage sensing module 112 at first communication controller 108 generates voltage signal 118 representing voltage Vp. Detecting module 114 detects voltage Vp dropping below a threshold value 206 at time $T_0$, and in response, detecting module 114 asserts change signal 120. Decoding module 116 then decodes voltage pulse 204 to obtain information 122, in response to assertion of change signal 120.

Figure 3:
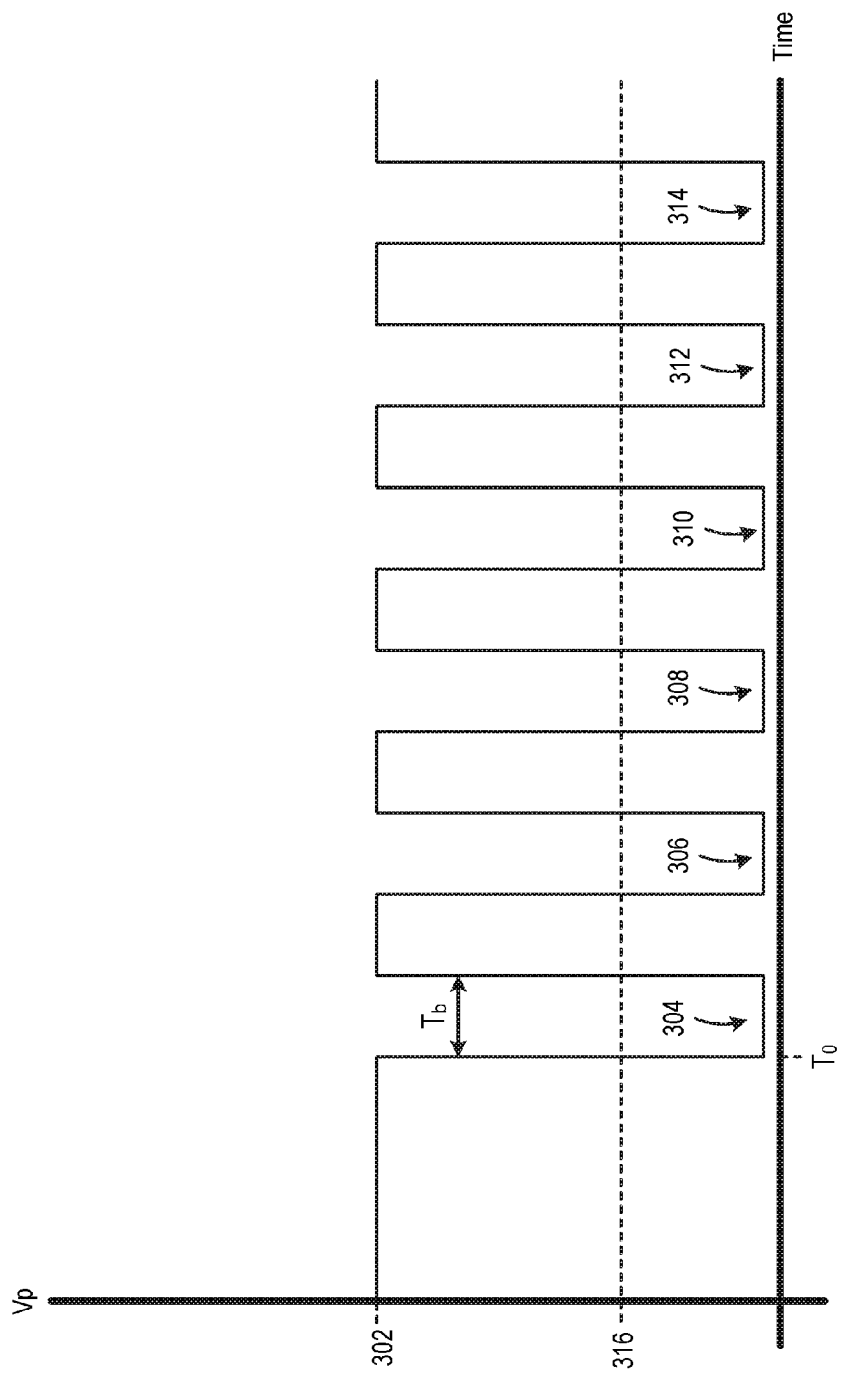
FIG. 3 illustrates one example of the FIG. 1 system transmitting information across a power line in multiple pulses, according to an embodiment.

FIG. 3 illustrates one example of system 100 transmitting information across power line 106 in multiple pulses. Prior to time $T_0$, voltage Vp on power line 106 has value 302. At time $T_0$, pulse control module 124 causes switching device 126 to switch from its non-conductive state to its conductive state in response to receipt of information 122. Consequentially, voltage Vp drops from value 302 to near zero at time $T_0$. Pulse control module 124 causes switching device 126 to remain in its conductive state for period $T_b$ to generate a voltage pulse 304 on power line 106. Pulse control module 124 subsequently causes switching device 126 to switch between its conductive and non-conductive states several times to generate additional pulses 306-314. Pulses 304-314 collectively implement a serial communications scheme. For example, in a particular embodiment, pulses 304 and 306 are start pulses, pulses 308 and 310 are data pulses, and pulse 312 and 314 are end pulses. Pulse control module 124 sets the state of data pulses 308 and 310 to represent information 122 as two-bit payload. Widths and timing of pulses 304-314 could vary without departing from the scope hereof.

Voltage sensing module 112 at first communication controller 108 generates voltage signal 118 representing voltage Vp. Detecting module 114 detects voltage Vp dropping below a threshold value 316 at time $T_0$, and in response, detecting module 114 asserts change signal 120. Decoding module 116 then decodes data pulses 308 and 310 to obtain information 122 in two-bit form, in response to assertion of change signal 120. In some alternate embodiments, pulses 304-314 represent information 122 in a different manner, such as based on width of one or more of the pulses and/or frequency of the pulses.

Switching device 126 typically has low impedance when operating in its conductive state. Therefore, transition of switching device 126 from its non-conductive state to its conductive state will typically cause current Ip flowing through power line 106 to significantly increase to a value beyond an expected normal operating range. Accordingly, first communication controller 108 can be modified to detect a change in operation of power line 106 in the current domain.

Figure 4:
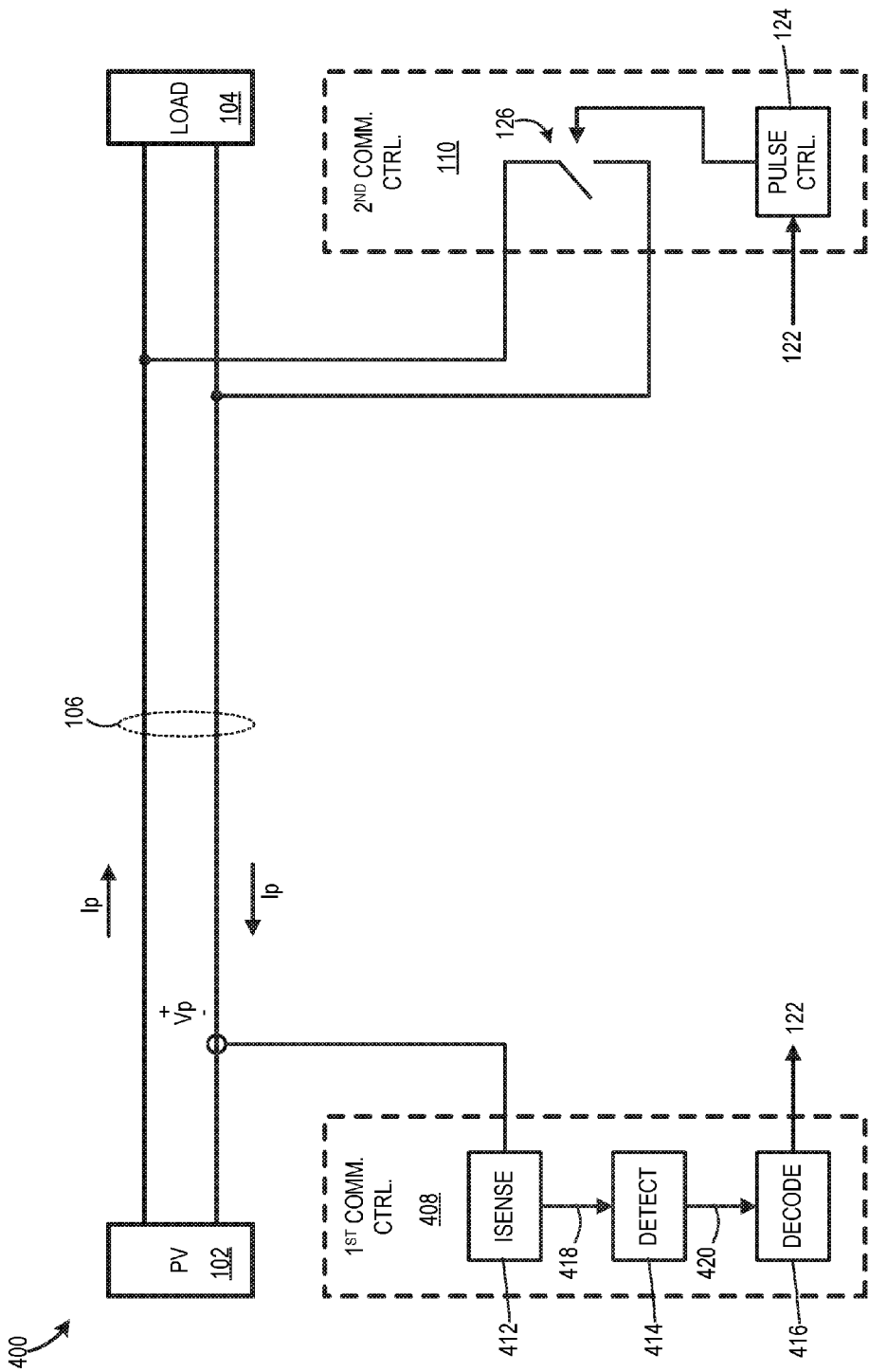
FIG. 4 illustrates a photovoltaic system capable of DC power line communication by changing operation of a power line in the current domain, according to an embodiment.

For example, FIG. 4 illustrates a photovoltaic system 400, which is like photovoltaic system 100 of FIG. 1, but where first communication controller 108 is replaced with a first communication controller 408 capable of detecting changes in power line 106 operation in the current domain. First communication controller 408 includes a current sensing module 412, a detecting module 414, and decoding module 416. Current sensing module 412 generates current signal 418 representing current Ip flowing through power line 106. In some embodiments, current sensing module 412 directly determines magnitude of current Ip, such as by sensing a voltage across a current sense resistor electrically coupled in series with power line 106. In some other embodiments, current sensing module 412 indirectly determines or estimates magnitude of current Ip, such as by using methods disclosed in U.S. Pat. Nos. 6,160,441 and 6,445,244 to Stratakos et al., each of which is incorporated herein by reference. Current signal 418 could be either an analog signal or a digital signal, depending on the implementation of current sensing module 412.

Detecting module 414 detects a change in operation of power line 106 in the current domain. Specifically, detecting module 414 monitors current signal 418 and generates a change signal 420 representing a change in operation of power line 106, in response to current Ip rising above a threshold value. In some embodiments, detecting module 414 compares only a DC component of current Ip to the threshold value. Additionally, in some embodiments, detecting module 414 is disabled during start-up and/or shut down of photovoltaic system 400, to avoid false detection of events associated with system start-up or shutdown. Detecting module 414 is at least partially implemented, in some embodiments, by digital and/or analog circuitry, such as comparison circuitry which compares current signal 418 to a reference signal representing the threshold value. Alternately or additionally, detecting module 414 is at least partially implemented by a processor executing instructions in the form of software or firmware stored in a memory, to perform the functions of detecting module 414. Change signal 420 is either an analog signal or a digital signal, depending on the implementation of detecting module 414.

Decoding module 416 decodes operating state of power line 106 to obtain transmitted information. Specifically, decoding module 416 decodes logic and/or timing of one or more current pulses on power line 106 to obtain information 122 transmitted from second communication controller 110, in response to assertion of change signal 420. For example, in some embodiments, decoding module 416 obtains information 122 based on the following: (1) a number of pulses on power line 106 within a particular time frame, (2) widths of one or more pulses on power line 106, (3) frequency of pulses on power line 106, and/or (4) a pattern of pulses on power line 106. In some embodiments, decoding module 416 is at least partially implemented by electronic circuitry, such as pulse detection and counting circuitry, which detects pulses on change signal 420 and their associated timing. Decoding module 416 is alternately or additionally implemented at least in part by a processor executing instructions in the form of software or firmware stored in a memory, to perform the functions of decoding module 416.

Although modules 412, 414, 416 of first communication controller 408 are illustrated as discrete elements, one or more of these modules may be partially or completely combined without departing from the scope hereof. For example, in a particular embodiment, detecting module 414 and decoding module 416 are implemented by a common processor executing instructions, in the form of firmware or software, stored in a memory.

Figure 5:
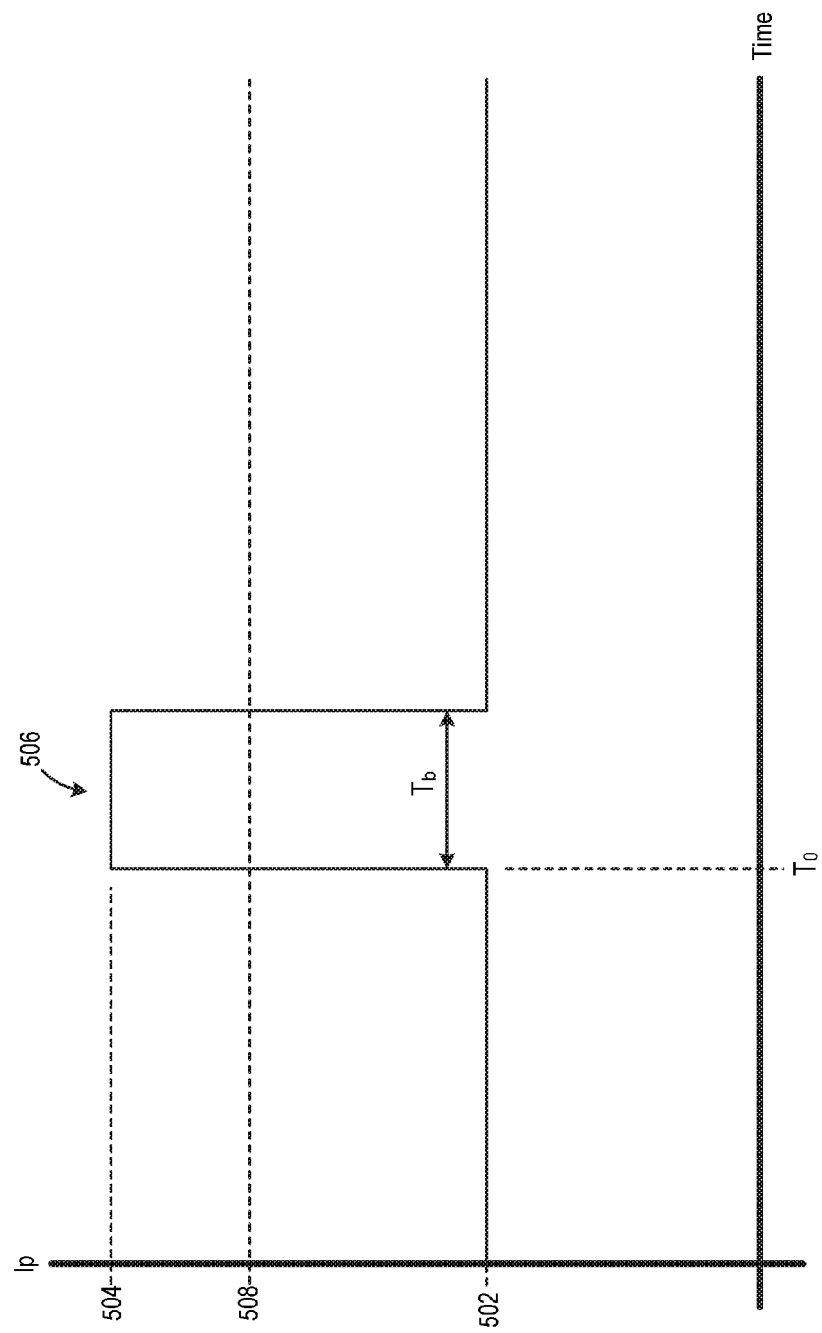
FIG. 5 illustrates one example of the FIG. 4 system transmitting information across a power line in a single pulse, according to an embodiment.

FIG. 5 illustrates one example of system 400 transmitting information across power line 106 in a single pulse. Prior to time $T_0$, current Ip flowing through power line 106 has value 502 which is, for example, a maximum power point current of photovoltaic device 102. At time $T_0$, pulse control module 124 causes switching device 126 to switch from its non-conductive state to its conductive state in response to receipt of information 122. Consequentially, current Ip increases from value 502 to value 504 at time $T_0$. Pulse control module 124 causes switching device 126 to remain in its conductive state for period $T_b$ to generate a current pulse 506 through power line 106, where current pulse 506 represents information 122.

Current sensing module 412 of first communication controller 408 generates current signal 418 representing current Ip. Detecting module 414 detects current Ip rising above a threshold value 508 at time $T_0$, and in response, detecting module 414 asserts change signal 420. Decoding module 416 then decodes current pulse 506 to obtain information 122, in response to assertion of change signal 420.

Photovoltaic system 400 could be configured to transmit information across power line 106 in multiple current pulses. For example, one embodiment of photovoltaic system 400 is configured to transmit information across power line 106 in a manner analogous to that discussed above with respect to FIG. 3.

Power line 106 may experience voltage and current disturbances during normal operation of photovoltaic system 100 or 400, such as due to changes in power available from photovoltaic device 102 or drawn by load 104. It is desirable to avoid erroneously detecting these disturbances as communication events. Therefore, in certain embodiments of systems 100 and 400, the pulses generated by switching device 126 on power line 106 are significantly different from those expected during normal disturbances on power line 106, or in other words, the pulses have one or more characteristics, such as magnitude, persistence, pattern, and/or frequency, that are not present during normal operation of power line 106. For example, the pulses may have a pattern, width, and/or frequency significantly different from expected normal disturbances. Detecting modules 114 and 414 may be configured to ignore pulses not having characteristics like those of pulses generated by second communication controller 110. Consider FIG. 3 again, for instance. The widths of start pulses 304 and 306 and the separation between pulses 304 and 306 may be selected so that start pulses 304 and 306 are significantly different from expected normal disturbances on power line 106, and detecting module 114 may be configured to ignore pulses other than the combination of start pulses 304 and 306.

Figure 6:
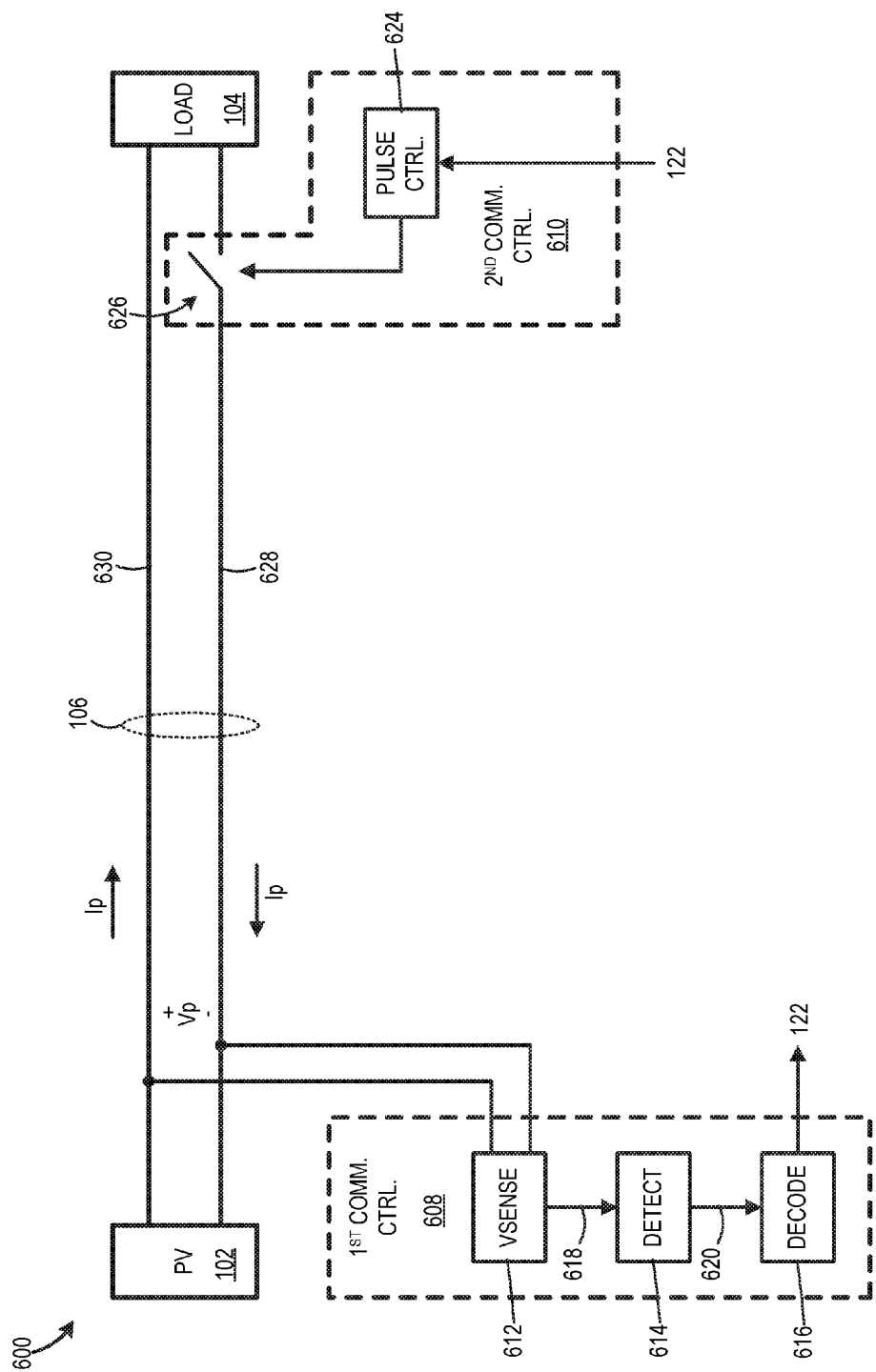
FIG. 6 illustrates a photovoltaic system which is similar to the FIG. 1 photovoltaic system, but where magnitude of voltage on the power line is increased to change operation of power line, according to an embodiment.

FIG. 6 illustrates a photovoltaic system 600 which is similar to photovoltaic system 100 of FIG. 1, but where magnitude of voltage Vp on power line 106 is increased beyond a normal expected range to change operation of power line 106. Photovoltaic system 600 has the same components as photovoltaic system 100, but with first communication controller 108 and second communication controller 110 replaced with first communication controller 608 and second communication controller 610, respectively.

First communication controller 608 includes a voltage sensing module 612, a detecting module 614, and decoding module 616. Voltage sensing module 612 generates a voltage signal 618 representing voltage Vp on power line 106. In some embodiments, voltage sensing module 612 is simply an electrical tap across power line 106, such that voltage signal 618 is the same as voltage Vp on power line 106. In some other embodiments, voltage sensing module 612 includes electronic circuitry, such as amplification circuitry, level-shifting circuitry, scaling circuitry, and/or analog-to-digital conversion circuitry, which generates voltage signal 618, so that voltage signal 618 represents, but is not necessarily the same as, voltage Vp. Voltage signal 618 could be either an analog signal or a digital signal, depending on the implementation of voltage sensing module 612.

Detecting module 614 detects a change in operation of power line 106 in the voltage domain. Specifically, detecting module 614 monitors voltage signal 618 and generates a change signal 620 representing a change in operation of power line 106, in response to voltage Vp rising above threshold value. In some embodiments, detecting module 614 compares only a DC component of voltage Vp to the threshold value. Additionally, in some embodiments, detecting module 614 is disabled during start-up and/or shut down of photovoltaic system 600, to avoid false detection of events associated with system start-up or shutdown. Detecting module 614 is at least partially implemented, in some embodiments, by digital and/or analog circuitry, such as comparison circuitry which compares voltage signal 618 to a reference signal representing the threshold value. Alternately or additionally, detecting module 614 is at least partially implemented by a processor executing instructions in the form of software or firmware stored in a memory, to perform the functions of detecting module 614. Change signal 620 is either an analog signal or a digital signal, depending on the implementation of detecting module 614.

Decoding module 616 decodes operating state of power line 106 to obtain transmitted information. Specifically, decoding module 616 decodes logic and/or timing of one or more voltage pulses on power line 106 to obtain information 122 transmitted from second communication module 610, in response to assertion of change signal 620. For example, in some embodiments, decoding module 616 obtains information 122 based on the following: (1) a number of pulses on power line 106 within a particular time frame, (2) widths of one or more pulses on power line 106, (3) frequency of pulses on power line 106, and/or (4) a pattern of pulses on power line 106. In some embodiments, decoding module 616 is at least partially implemented by electronic circuitry, such as pulse detection and counting circuitry, which detects pulses on change signal 620 and their associated timing. Decoding module 616 is alternately or additionally implemented at least in part by a processor executing instructions in the form of software or firmware stored in a memory, to perform the functions of decoding module 616. Information 122 is either in analog or digital form, depending on the implementation of decoding module 116.

Second communication controller 610 includes a pulse control module 624 and a switching device 626 electrically coupled in series with power line 106. Pulse control module 624 receives information 122 to be communicated to first communication controller 608, and pulse control module 624 encodes operating state of power line 106 to represent information 122 by controlling switching device 626 to vary operation of power line 106 in the voltage domain.

In particular, pulse control module 624 causes switching device 626 to operate in its conductive state under normal operation of photovoltaic system 600, i.e., when power line 106 is not transmitting information. However, upon receipt of information 122, pulse control module 624 causes switching device 626 to switch from its conductive state to its non-conductive state, thereby impeding flow of current Ip through power line 106 and causing voltage Vp to rise to a value outside of an expected normal operating range. Pulse control module 624 causes switching device 626 to remain in its non-conductive state for a predetermined period of time, thereby generating a voltage pulse on power line 106 representing information 122. In some embodiments, pulse control module 624 is adapted to control switching device 626 to generate several voltage pulses on power line 106 in response to information 122, such as to transmit several bits of information representing information 122 and/or communication protocols. In some other embodiments, pulse control module 624 is adapted to control switching device 626 to remain in its non-conductive state indefinitely in response to information 122, thereby generating a voltage pulse on power line 106 having an indefinite width. Pulse control module 624 may also be configured such that voltage pulses generated on power line 106 by switching device 626 are significantly different from voltage disturbances expected during normal operation of photovoltaic system 600, and detecting module 614 may be configured to ignore pulses not having characteristics like those generated by second communication controller 610.

Pulse control module 624 may be implemented by hardware, by a processor executing instructions in the form of software or firmware stored in a memory, or a combination thereof. For example, in a particular embodiment, pulse control module 624 includes pulse detection circuitry which detects information 122 in the form of one or more pulses on an input signal to pulse control module 624, as well as circuitry which causes switching device 626 to operate in its non-conductive state for a predetermined amount of time in response to each detected pulse of information 122. As another example, in a particular embodiment, pulse control module 624 includes a processor executing instructions, in the form of software or firmware stored in a memory, which control switching of switching device 626 in a predetermined manner in response to information 122, thereby encoding information 122 in the form of voltage pulses on power line 106.

Some alternate embodiments include one or more additional electrical components, such as resistors and/or capacitors, electrically coupled in parallel with switching device 626. These additional electrical components provide a path for current Ip when switching device 626 is in its non-conductive state. Consequentially, in these alternate embodiments, magnitude of current Ip potentially has a non-zero value when switching device 626 is in its non-conductive state.

Figure 7:
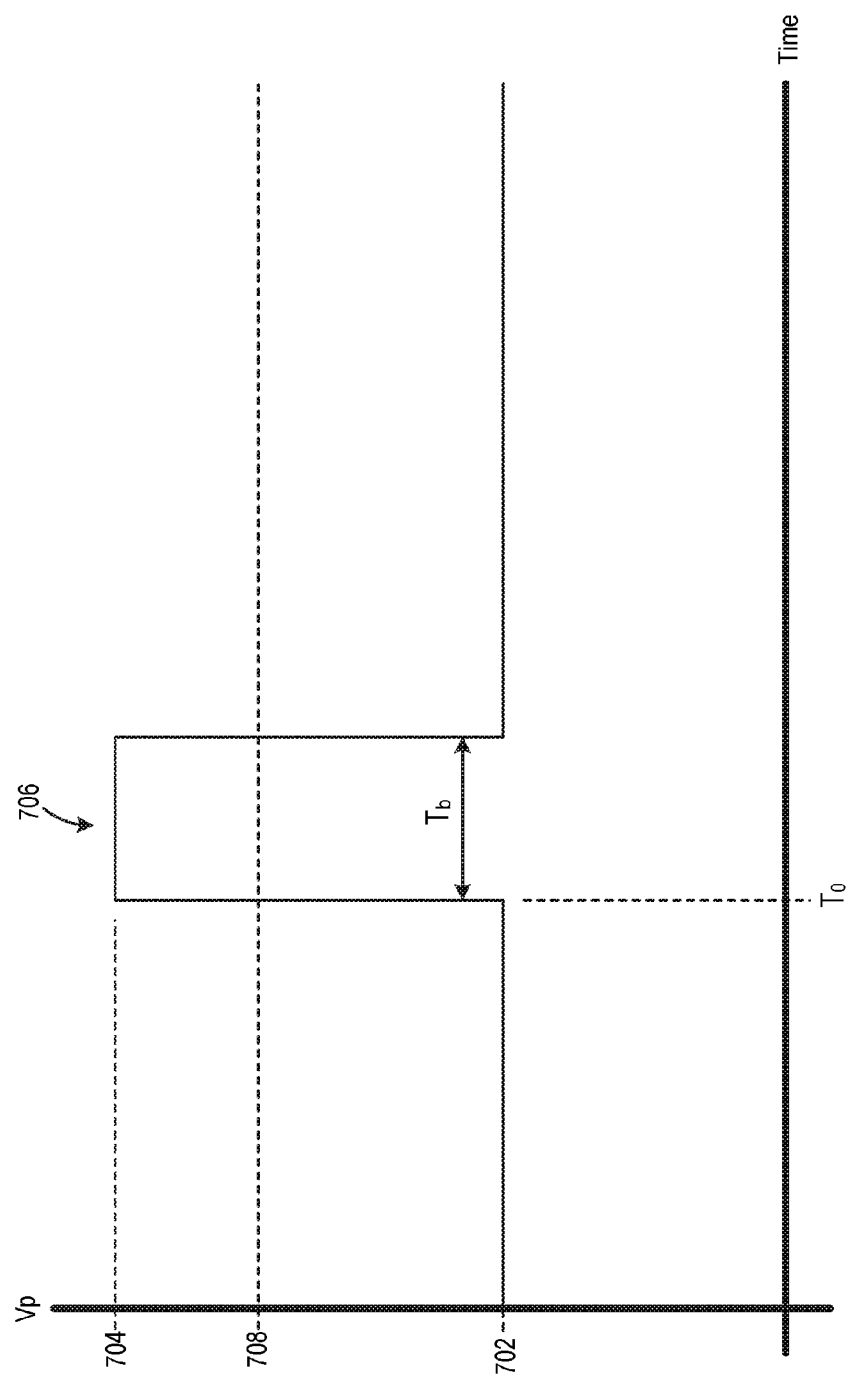
FIG. 7 illustrates one example of the FIG. 6 system transmitting information across a power line in a single pulse, according to an embodiment.

FIG. 7 illustrates one example of system 600 transmitting information across power line 106 in a single pulse. Prior to time $T_0$, voltage Vp on power line 106 has value 702 which is, for example, a maximum power point voltage of photovoltaic device 102. At time $T_0$, pulse control module 624 causes switching device 626 to switch from its conductive state to its non-conductive state in response to receipt of information 122. Consequentially, voltage Vp rises from value 702 to open circuit voltage 704 of photovoltaic device 102 at time $T_0$. Pulse control module 624 causes switching device 626 to remain in its non-conductive state for period $T_b$ to generate a voltage pulse 706 on power line 106, where voltage pulse 706 represents information 122.

Voltage sensing module 612 of first communication controller 608 generates voltage signal 618 representing voltage Vp. Detecting module 614 detects voltage Vp rising above a threshold value 708 at time $T_0$, and in response, detecting module 614 asserts change signal 620. Decoding module 616 then decodes voltage pulse 706 to obtain information 122, in response to assertion of change signal 620.

Transition of switching device 626 from its conductive state to its non-conductive state will cause current Ip to significantly decrease to a value that is outside of an expected normal operating range, such as to zero. Accordingly, first communication controller 608 can be modified to detect a change in operation of power line 106 in the current domain.

Figure 8:
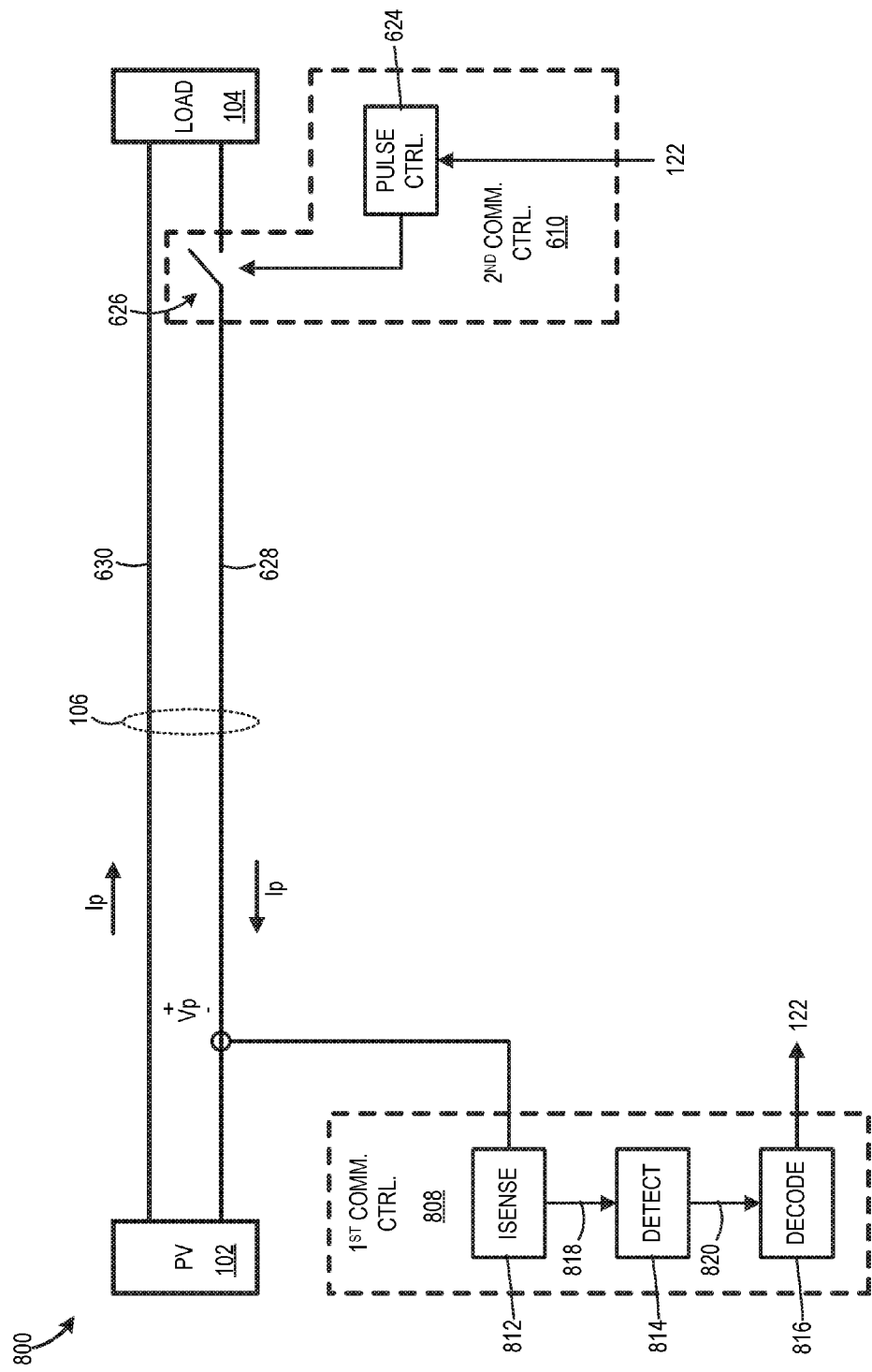
FIG. 8 illustrates another photovoltaic system capable of DC power line communication by changing operation of a power line in the current domain, according to an embodiment.

FIG. 8 illustrates a photovoltaic system 800, which is like photovoltaic system 600 of FIG. 6, but where first communication controller 608 is replaced with a first communication controller 808 capable of detecting changes in power line 106 operation in the current domain. First communication controller 808 includes a current sensing module 812, a detecting module 814, and a decoding module 816. Current sensing module 812 generates current signal 818 representing current Ip flowing through power line 106. In some embodiments, current sensing module 812 directly determines magnitude of current Ip, such as by sensing a voltage across a current sense resistor electrically coupled in series with power line 106. In some other embodiments, current sensing module 812 indirectly determines or estimates magnitude of current Ip, such as by using methods disclosed in U.S. Pat. Nos. 6,160,441 and 6,445,244 to Stratakos et al. Current signal 818 could be either an analog signal or a digital signal, depending on the implementation of current sensing module 812.

Detecting module 814 detects a change in operation of power line 106 in the current domain. Specifically, detecting module 814 monitors current signal 818 and generates a change signal 820 representing a change in operation of power line 106, in response to current Ip falling below a threshold value. In particular embodiments, detecting module 814 compares only a DC component of current Ip to the threshold value. In some other embodiments, detecting module 814 monitors current signal 818 and generates a change signal 820 representing a change in operation of power line 106, in response to a change in polarity of a DC component of current Ip, which is caused, for example, by an external device (not shown) or load 104 injecting current into power line 106, thereby causing polarity of current Ip to change. Additionally, in some embodiments, detecting module 814 is disabled during start-up and/or shut down of photovoltaic system 800, to avoid false detection of events associated with system start-up or shutdown. Additionally, detecting module 814 may be configured to ignore pulses not having characteristics like those generated by second communication controller 610.

Detecting module 814 is at least partially implemented, in some embodiments, by digital and/or analog circuitry, such as comparison circuitry which compares current signal 818 to a reference signal representing the threshold value. Alternately or additionally, detecting module 814 is at least partially implemented by a processor executing instructions in the form of software or firmware stored in a memory, to perform the functions of detecting module 814. Change signal 820 is either an analog signal or a digital signal, depending on the implementation of detecting module 814.

Decoding module 816 decodes operating state of power line 106 to obtain transmitted information. Specifically, decoding module 816 decodes logic and/or timing of one or more current pulses on power line 106 to obtain information 122 transmitted from second communication module 610, in response to assertion of change signal 820. For example, in some embodiments, decoding module 816 obtains information 122 based on the following: (1) a number of pulses on power line 106 within a particular time frame, (2) widths of one or more pulses on power line 106, (3) frequency of pulses on power line 106, and/or (4) a pattern of pulses on power line 106.

In some embodiments, decoding module 816 is at least partially implemented by electronic circuitry, such as pulse detection and counting circuitry, which detects pulses on change signal 820 and their associated timing. Decoding module 816 is alternately or additionally implemented at least in part by a processor executing instructions in the form of software or firmware stored in a memory, to perform the functions of decoding module 816. Information 122 is either in analog or digital form, depending on the implementation of decoding module 816.

Although modules 812, 814, 816 of first communication controller 808 are illustrated as discrete elements, one or more of these modules may be partially or completely combined without departing from the scope hereof. For example, in a particular embodiment, detecting module 814 and decoding module 816 are implemented by a common processor executing instructions, in the form of firmware or software, stored in a memory.

Figure 9:
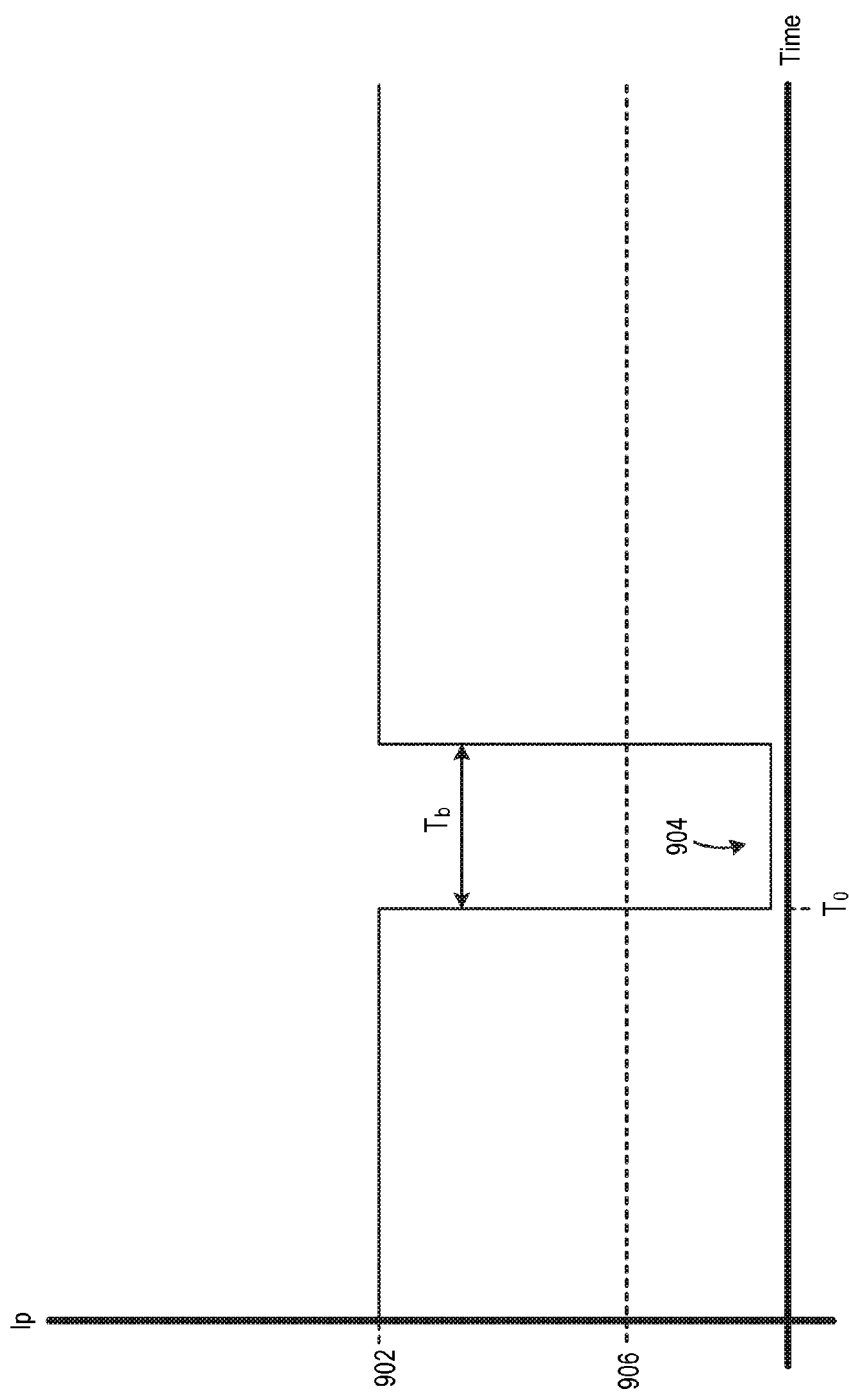
FIG. 9 illustrates one example of the FIG. 8 system transmitting information across a power line in a single pulse, according to an embodiment.

FIG. 9 illustrates one example of system 800 transmitting information across power line 106 in a single pulse. Prior to time $T_0$, current Ip flowing through power line 106 has value 902 which is, for example, a maximum power point current of photovoltaic device 102. At time $T_0$, pulse control module 624 causes switching device 626 to switch from its conductive state to its non-conductive state in response to receipt of information 122. Consequentially, current Ip decreases from value 902 to near zero at time $T_0$. Pulse control module 624 causes switching device 626 to remain in its non-conductive state for period $T_b$ to generate a current pulse 904 through power line 106, where current pulse 904 represents information 122.

Current sensing module 812 of first communication controller 808 generates current signal 818 representing current Ip. Detecting module 814 detects current Ip falling below a threshold value 906 at time $T_0$, and in response, detecting module 814 asserts change signal 820. Decoding module 816 then decodes current pulse 904 to obtain information 122, in response to assertion of change signal 820.

Photovoltaic system 800 could be configured to transmit information across power line 106 in multiple current pulses. For example, one embodiment of photovoltaic system 800 is configured to transmit information across power line 106 in a manner analogous to that discussed above with respect to FIG. 3. Pulse control module 624 could also be configured such that current pulses generated on power line 106 by switching device 626 are significantly different from current disturbances expected during normal operation of photovoltaic system 600.

Switching device 626 is illustrated in FIGS. 6 and 8 as being electrically coupled in series with a negative conductor 628 of power line 106. However, switching device 626 could alternately be electrically coupled in series with a positive power conductor 630 of power line 106. In some alternate embodiments of photovoltaic system 600 or 800 including multiple photovoltaic devices 102 and/or multiple loads 104, the location of switching device 626 in power line 106 may affect extent of communication within the photovoltaic system. For example, consider an alternate embodiment of photovoltaic system 600 including multiple strings of photovoltaic devices 102 electrically coupled in parallel. Placing switching device 626 in a portion of power line 106 serving multiple strings allows simultaneous communication with all of the strings. On the flip side, placing switching device 626 in a portion of power line 106 serving only a single string allows individual communication with the particular string.

Figure 10:
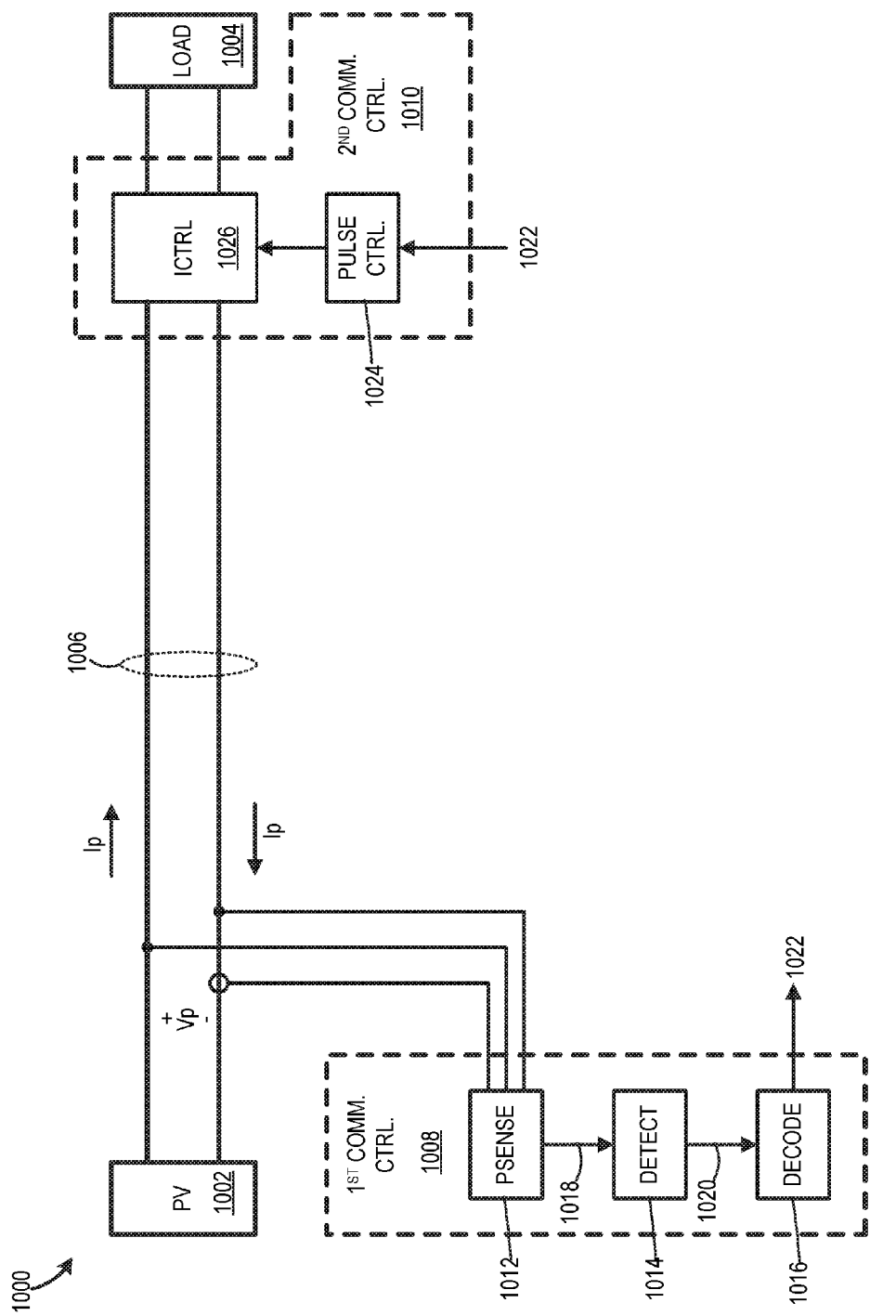
FIG. 10 illustrates a photovoltaic system capable of DC power line communication by changing operation of a power line in the power domain, according to an embodiment.

Applicant has further determined that information can be transmitted across a power line in the power domain, where power is the product of voltage and current under DC conditions. FIG. 10 illustrates a photovoltaic system 1000 capable of DC power line communication by changing operation of a power line in the power domain. Photovoltaic system 1000 includes a photovoltaic device 1002 electrically coupled to a load 1004 via a power line 1006. Load 1004 is, for example, an inverter for transforming DC power from photovoltaic device 1002 to AC power. Load 1004 could take other forms, however, without departing from the scope hereof.

Photovoltaic system 1000 further includes a first communication controller 1008 and a second communication controller 1010. First communication controller 1008 includes a power sensing module 1012, a detecting module 1014, and decoding module 1016. Power sensing module 1012 generates a power signal 1018 representing power P being transmitted by power line 1006 from photovoltaic device 1002 to load 1004. In some embodiments, power sensing module 1012 generates power signal 1018 from the product of signals representing voltage Vp on power line 1006 and current Ip through power line 1006. Voltage Vp and current Ip are determined, for example, using techniques similar to those discussed with respect to voltage sensing module 112 and current sending module 412, respectively. Power signal 1018 is either an analog signal or a digital signal, depending on the implementation of power sensing module 1012.

Detecting module 1014 detects a change in operation of power line 1006 in the power domain. Specifically, detecting module 1014 monitors power signal 1018 and asserts a change signal 1020 representing a change in operation of power line 1006, in response to power P dropping below a threshold value. In some alternate embodiments, however, detecting module 1014 asserts change signal 1020 in response to power P rising above a threshold value. Furthermore, in yet other alternate embodiments, detecting module 1014 asserts change signal 1020 in response to "negative" flow of power through power line 1006, or in other words, in response to power flowing from load 1004 to photovoltaic device 1002. In certain embodiments, detecting module 1014 compares only a DC component of power P to the threshold value. Additionally, in some embodiments, detecting module 1014 is disabled during start-up and/or shut down of photovoltaic system 1000, to avoid false detection of events associated with system start-up or shutdown. Detecting module 1014 is at least partially implemented, in some embodiments, by digital and/or analog circuitry, such as comparison circuitry which compares power signal 1018 to a reference signal representing the threshold value. Alternately or additionally, detecting module 1014 is at least partially implemented by a processor executing instructions in the form of software or firmware stored in a memory, to perform the functions of detecting module 1014. Change signal 1020 is either an analog signal or a digital signal, depending on the implementation of detecting module 1014.

Decoding module 1016 decodes operating state of power line 1006 to obtain transmitted information. Specifically, decoding module 1016 decodes logic and/or timing of one or more power pulses on power line 1006 to obtain information 1022 transmitted from second communication module 1010, in response to assertion of change signal 1020. For example, in some embodiments, decoding module 1016 obtains information 1022 based on the following: (1) a number of pulses on power line 1006 within a particular time frame, (2) widths of one or more pulses on power line 1006, (3) frequency of pulses on power line 1006, and/or (4) a pattern of pulses on power line 106. In some embodiments, decoding module 1016 is at least partially implemented by electronic circuitry, such as pulse detection and counting circuitry, which detects pulses on change signal 1020 and their associated timing. Decoding module 1016 is alternately or additionally implemented at least in part by a processor executing instructions in the form of software or firmware stored in a memory, to perform the functions of decoding module 1016. Information 1022 is either in analog or digital form, depending on the implementation of decoding module 1016.

Although modules 1012, 1014, 1016 of first communication controller 1008 are illustrated as discrete elements, one or more of these modules may be partially or completely combined without departing from the scope hereof. For example, in a particular embodiment, detecting module 1014 and decoding module 1016 are implemented by a common processor executing instructions, in the form of firmware or software, stored in a memory.

Second communication controller 1010 includes a pulse control module 1024 and a power control module 1026 electrically coupled to load 1004. Power control module 1026 is capable of controlling power drawn by load 1004. In some embodiments, power control module 1026 includes circuitry, such as a DC-to-DC converter, separate from load 1004. In some other embodiments, power control module 1026 is part of load 1004. For example, in certain embodiments where load 1004 is an inverter, power control module 1026 includes circuitry within the inverter for adjusting power output of the inverter. Pulse control module 1024 receives information 1022 to be communicated to first communication controller 1008, and pulse control module 1024 encodes operating state of power line 1006 to represent information 1022 by controlling power control module 1026 to vary operation of power line 1006 in the power domain.

In particular, pulse control module 1024 causes power control module 1026 to not affect power drawn by load 1004 under normal operation of photovoltaic system 1000, i.e., when power line 1006 is not transmitting information. However, upon receipt of information 1022, pulse control module 1024 causes power control module 1026 to decrease power drawn by load 1004 to a value that is outside an expected normal operating range, thereby changing operation of power line 1006 in the power domain. Pulse control module 1024 causes power control module 1026 to decrease load 1004's power draw for a predetermined period of time, thereby generating a power pulse on power line 1006 representing information 1022. Alternately, pulse control module 1024 causes power control module 1026 to decrease load 1004's power draw indefinitely in response to information 1022, thereby generating a power pulse on power line 1006 having an indefinite width. In some embodiments, pulse control module 1024 is adapted to control power control module 1026 to generate several power pulses on power line 1006 in response to information 1022, such as to transmit several bits of information representing information 1022 and/or communication protocols. In some alternate embodiments, pulse control module 1024 causes power control module 1026 to increase, instead of decrease, power drawn by load 1004 upon receipt of information 1022. In these alternate embodiments, detecting module 1014 of first communication controller 1008 is also modified to assert change signal 1020 in response to power P rising above, instead of falling below, a threshold value. Pulse control module 1024 may be implemented by hardware, by a processor executing instructions in the form of software or firmware stored in a memory, or a combination thereof.

Figure 11:
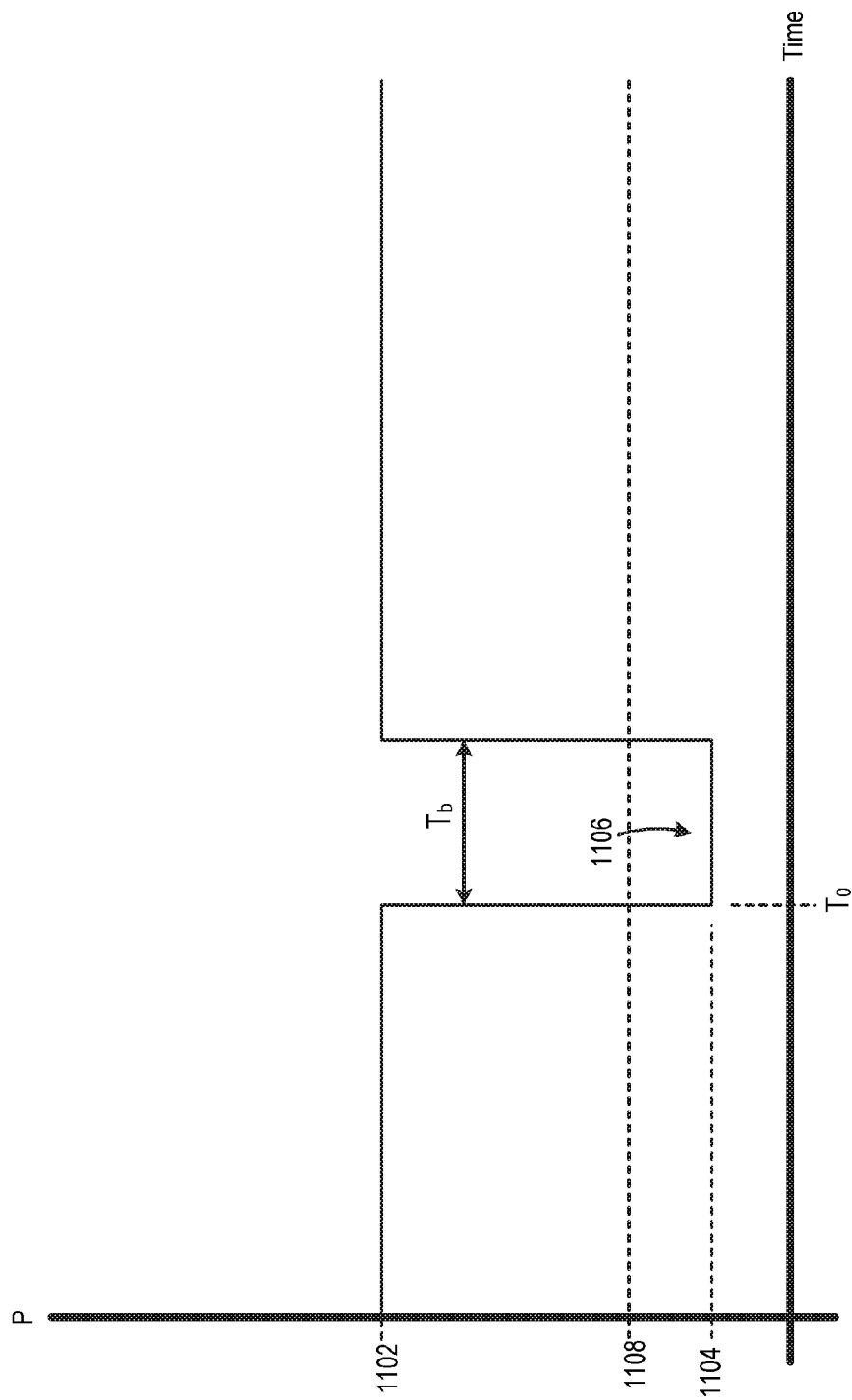
FIG. 11 illustrates one example of the FIG. 10 system transmitting information across a power line in a single pulse, according to an embodiment.

FIG. 11 illustrates one example of system 1000 transmitting information across power line 1006 in a single pulse. Prior to time $T_0$, power P flowing through power line 1006 has value 1102 which is, for example, a maximum power point of photovoltaic device 1002. At time $T_0$, pulse control module 1024 causes power control module 1026 to reduce power drawn by load 1004 from value 1102 to 1104. Pulse control module 1024 causes power control module 1026 to keep load 1004's power dissipation at value 1104 for period $T_b$ to generate a power pulse 1106 on power line 1006, where power pulse 1106 represents information 1022.

Power sensing module 1012 at first communication controller 1008 generates power signal 1018 representing power P. Detecting module 1014 detects power P dropping below a threshold value 1108 at time $T_0$, and in response, detecting module 1014 asserts change signal 1020. Decoding module 1016 then decodes power pulse 1106 to obtain information 1022, in response to assertion of change signal 1020.

In some embodiments, pulse control module 1024 may also be configured such that power pulses generated on power line 1006 by switching device 1026 are significantly different from power disturbances expected during normal operation of photovoltaic system 1000, or in other words, such that the power pulses have one or more characteristics, such as magnitude, persistence, frequency, and/or pattern not present during normal operation of power line 1006. Detecting module 1014 may be configured to ignore pulses not having characteristics like those generated by second communication controller 1010, in these embodiments.

Figure 12:
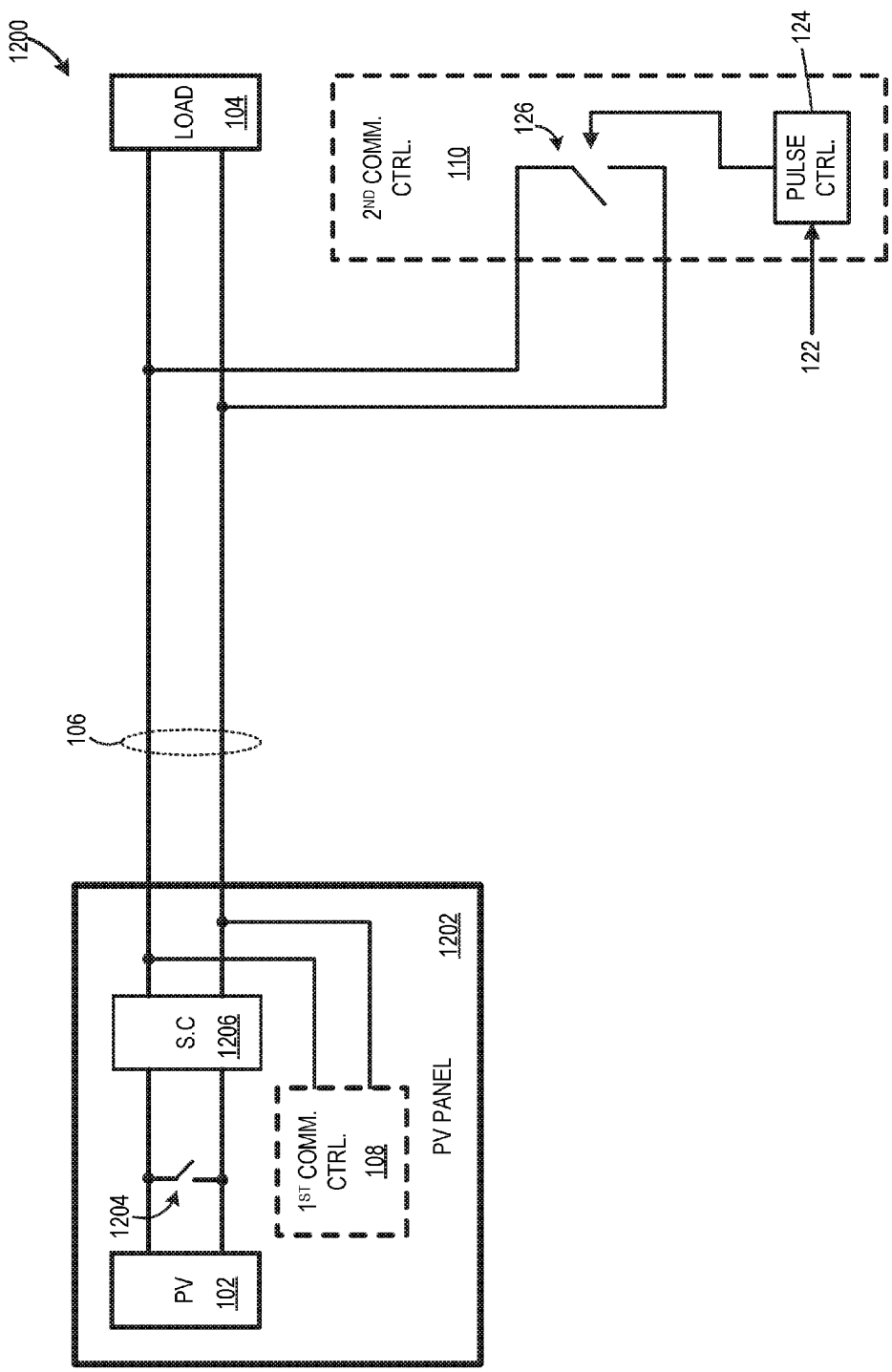
FIG. 12 illustrates a photovoltaic system like that of FIG. 1, but where a photovoltaic device and a first communication controller are co-packaged in a common photovoltaic panel, according to an embodiment.

First communication controllers 108, 408, 608, 808, or 1008 and/or second communication controllers 110, 610, or 1010 can be co-packaged with various photovoltaic system components or can be remote from system components. For example, FIG. 12 illustrates a photovoltaic system 1200, which is like photovoltaic system 100 of FIG. 1, but where photovoltaic device 102 and first communication controller 108 are co-packaged in a common photovoltaic panel 1202. Details of first communication controller 108 are not shown in FIG. 12 to promote illustrative clarity.

Co-packaging of photovoltaic device 102 and first communication controller 108 may be particularly useful when information communicated from second communication controller 110 to first communication controller 108 includes commands to disable or enable photovoltaic device 102. In this document, disabling a photovoltaic device means to reduce availability of power from the photovoltaic device to either zero or a non-zero value. Conversely, enabling a photovoltaic device means to increase availability of power from the photovoltaic device. In embodiments supporting enabling and disabling of photovoltaic device 102, the system further includes circuitry for disabling photovoltaic device 102, such as a disable switch 1204 capable of shorting photovoltaic device 102. Disable switch 1204 could alternately be replaced with a switch electrically coupled in series with photovoltaic device 102, where the switch opens in response to a disable command to isolate photovoltaic device 102 from power line 106. Photovoltaic panel 1202 optionally includes a switching circuit 1206 in place of or in addition to disable switch 1204. Switching circuit 1206 is capable of preventing photovoltaic device 102 from providing power to power line 106. Switching circuit 1206 has, for example, a buck-type, boost-type, or buck-boost-type topology, and in some embodiments, switching circuit 1206 is capable of performing MPPT.

Figure 13:
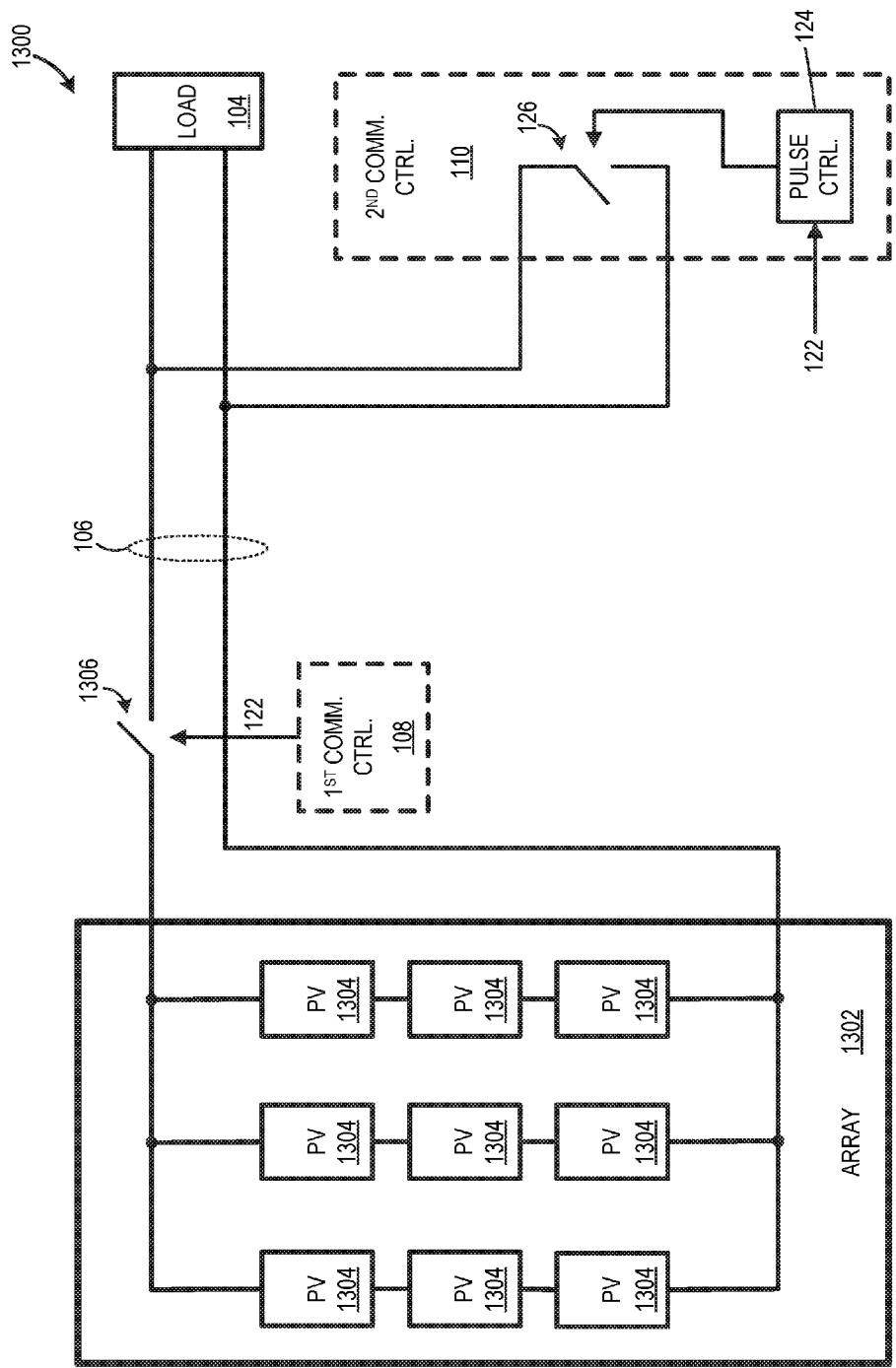
FIG. 13 illustrates a photovoltaic system like that of FIG. 1, but where the photovoltaic device is an array of photovoltaic modules, and the first communication controller is communicatively coupled to a disable switch, according to an embodiment.

As another example, FIG. 13 illustrates a photovoltaic system 1300, which is like photovoltaic system 100 of FIG. 1, but where photovoltaic device 102 is an array 1302 of photovoltaic modules 1304 and first communication controller 108 is communicatively coupled to a disable switch 1306. Details of first communication controller 108 are not shown in FIG. 13 to promote illustrative clarity. Disable switch 1306 is disposed at an edge of array 1302 and is capable of enabling and disabling array 1302 based on information 122 communicated from second communication controller 110 to first communication controller 108. In particular, switch 1306 closes in response to information 122 including an enable command, thereby electrically coupling array 1302 to power line 106. Switch 1306 opens in response to information 122 including a disable command, thereby electrically isolating array 1302 from power line 106. In some alternate embodiments, array 1302 is replaced with a single string of photovoltaic devices.

Figure 14:
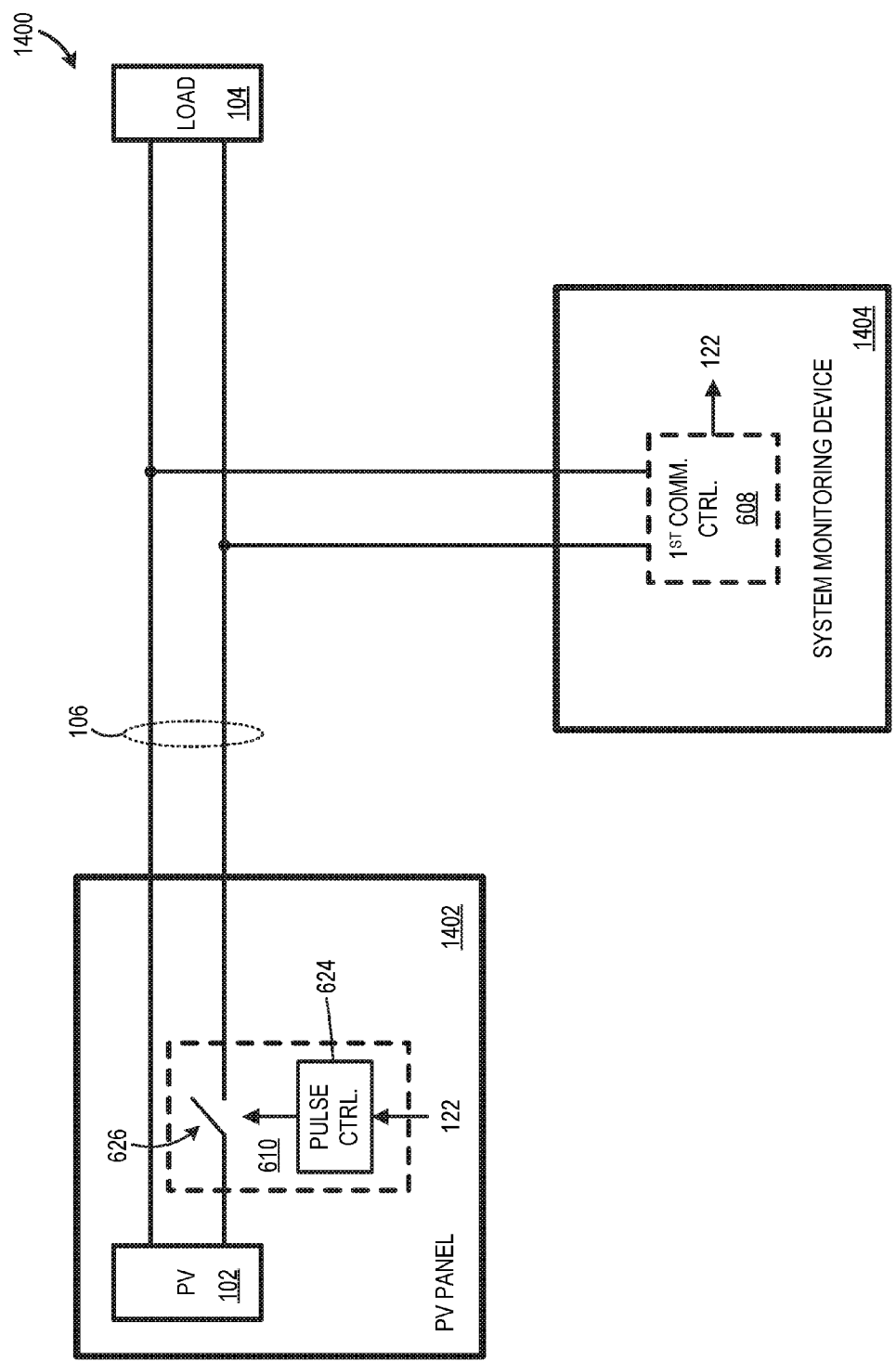
FIG. 14 illustrates a photovoltaic system like that of FIG. 6, but a where second communication controller is co-packaged with photovoltaic device in a photovoltaic panel, and where a first communication controller is part of a system monitoring device, according to an embodiment.

As yet another example, FIG. 14 illustrates a photovoltaic system 1400, which is similar to photovoltaic system 600 of FIG. 6, but where second communication controller 610 is co-packaged with photovoltaic device 102 in a photovoltaic panel 1402, and first communication controller 608 is part of a system monitoring device 1404. In this system, second communication controller 610 communicates status or fault information of photovoltaic device 102 to first communication controller 608, to enable monitoring by system monitoring device 1404. Details of first communication controller 608 are not shown in FIG. 13 to promote illustrative clarity.

Figure 15:
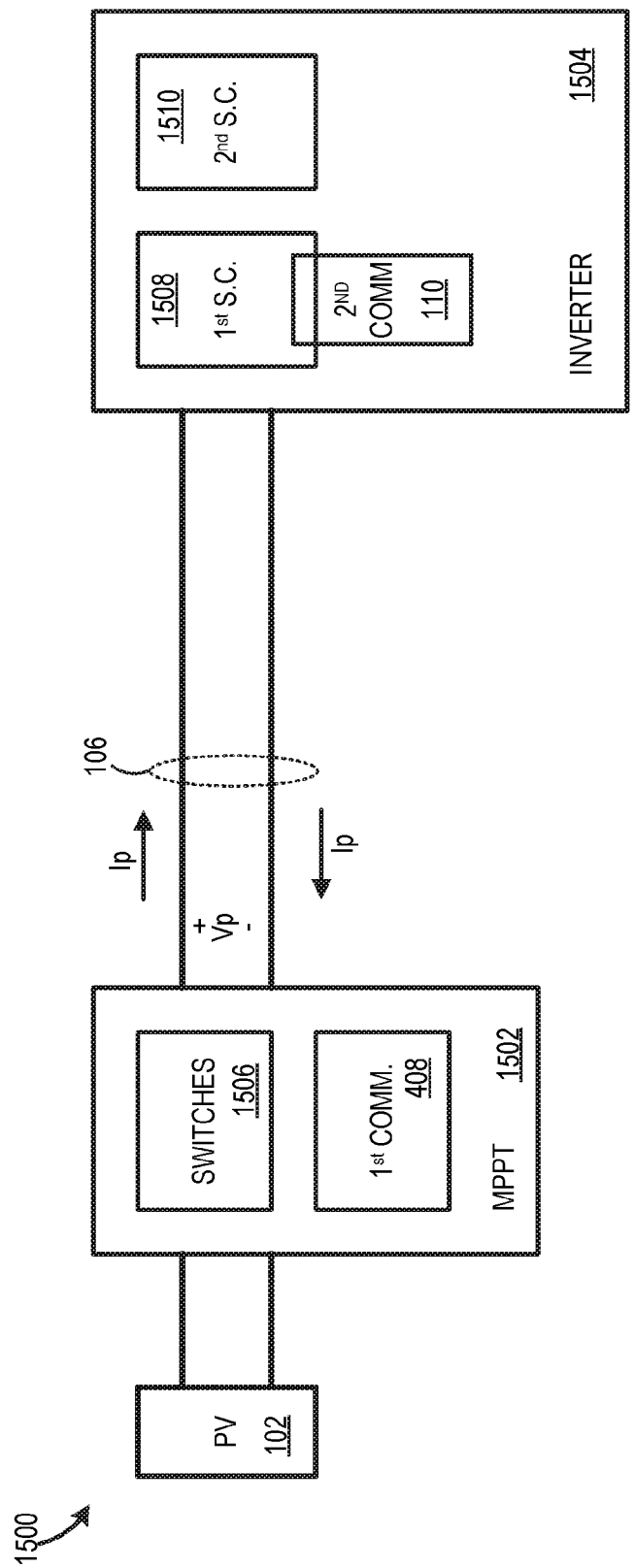
FIG. 15 illustrates a photovoltaic system which is similar to the FIG. 4 photovoltaic system, but where a first communication controller is part of an MPPT controller, and a second communication controller is part of an inverter, according to an embodiment.

In some embodiments, first communication controller 108, 408, 608, 808, or 1008 and/or second communication controller 110, 610, or 1010 share one or more components with another photovoltaic system element. For example, FIG. 15 illustrates a photovoltaic system 1500, which is similar to photovoltaic system 400 of FIG. 4, but where first communication controller 408 is part of an MPPT controller 1502, and second communication controller 110 is part of an inverter 1504, where inverter 1504 serves as load 104. MPPT controller 1502 is electrically coupled between photovoltaic device 102 and power line 106, and MPPT controller 1502 is capable of causing one or more switching devices 1506 therein to repeatedly switch between their conductive and non-conductive states in a manner which maximizes transfer of power from photovoltaic device 102 to inverter 1504. MPPT controller 1502 has, for example, a buck-type, boost-type, or buck-boost-type topology. Current sensing circuitry used for MPPT in MPPT controller 1502 also serves as current sensing module 412 in some embodiments. Details of first communication controller 408 and second communication controller 110 are not shown in FIG. 15 to promote illustrative clarity.

In some alternate embodiments, first communication controller 408 is replaced with first communication controller 108 of FIG. 1. In these embodiments, voltage sensing circuitry used for MPPT in MPPT controller 1502 also serves as voltage sensing module 112. Voltage Vp may be directly sensed, or voltage Vp may be estimated, such as from a duty cycle of one or more switching circuits 1506.

In some embodiments, second communication controller 110 sends disable and enable commands to first communication controller 408, and in these embodiments, MPPT controller 1502 is capable of controlling switching devices 1506 to enable or disable availability of power from photovoltaic device 102 to power line 106, thereby changing operating mode of MPPT controller 1502. In certain embodiments supporting disabling and enabling, MPPT controller 1502 causes photovoltaic device 102 to provide a small amount of power to power line 106 in the disable operating mode, to allow for communication of information via power line 106 during the disable mode. For example, in a particular embodiment, MPPT controller 1502 reduces voltage Vp on power line 106 to about twenty volts in response to receiving a disable command from second communication controller 110.

Inverter 1504 includes a first switching circuit 1508 and a second switching circuit 1510. Second switching circuit 1510 converts DC power from photovoltaic device 102 into AC power. In some embodiments, second switching circuit 1510 has a half-bridge or a full-bridge topology. First switching circuit 1508 interfaces second switching circuit 1510 with power line 106. In certain embodiments, first switching circuit 1508 has a boost-type topology for increasing magnitude of voltage Vp to a voltage that is suitably high for use by second switching circuit 1510. First switching circuit 1508 optionally further includes MPPT capability to maximize power extracted from photovoltaic device 102.

Second communication controller 110 uses one or more switching devices of first switching circuit 1508, as symbolically illustrated by the overlap of second communication controller 110 and first switching circuit 1508, to change operation of power line 106 in the voltage domain, current domain, or power domain, as well as to generate pulses on power line 106 to transmit information. For example, in some embodiments, one or more switches of first switching circuit 1508 shunt power line 106 to transfer information, such as in a manner similar to that discussed above with respect to FIGS. 2, 3, and 5. As another example, in some other embodiments, one or more switches of first switching circuit 1508 impede flow of current Ip through power line 106 to transfer information, such as in a manner similar to that discussed above with respect to FIGS. 7 and 9. As another example, in some other embodiments, one or more switches of first switching circuit 1508 change magnitude of power drawn by inverter 1504 to transfer information, such as in a manner similar to that discussed above with respect to FIG. 11. As yet another example, in some other embodiments, first switching circuit 1508 increases magnitude of voltage Vp to a value higher than the open circuit voltage of photovoltaic device 102, such that inverter 1504 injects current into power line 106 and polarity of current Ip reverses, causing power to flow through power line 106 from inverter 1504 to photovoltaic device 102, thereby changing operation of power line 106. In these particular embodiments, detecting module 414 is configured to generate current signal 420 in response to current signal 418 representing a change in polarity of a DC component of current Ip, which indicates "reverse" flow of power in photovoltaic system 1500, i.e., from inverter 1504 to photovoltaic device 102.

Furthermore, in some embodiments, second communication controller 110 is configured to encode operating state of power line 106 to represent and transmit information by causing first switching circuit 1508 to change voltage Vp, current Ip, or power through power line 106 between two or more non-zero values to transfer information, such as based on peak magnitude, frequencies, and/or patterns in the voltage, current, or power domains. For example, in particular embodiments, second communication controller 110 causes first switching circuit 1508 to generate a sine wave, a triangle wave, or a square wave in the voltage, current, or power domains to represent and transmit information from inverter 1504 to MPPT controller 1502 via power line 106.

Figure 16:
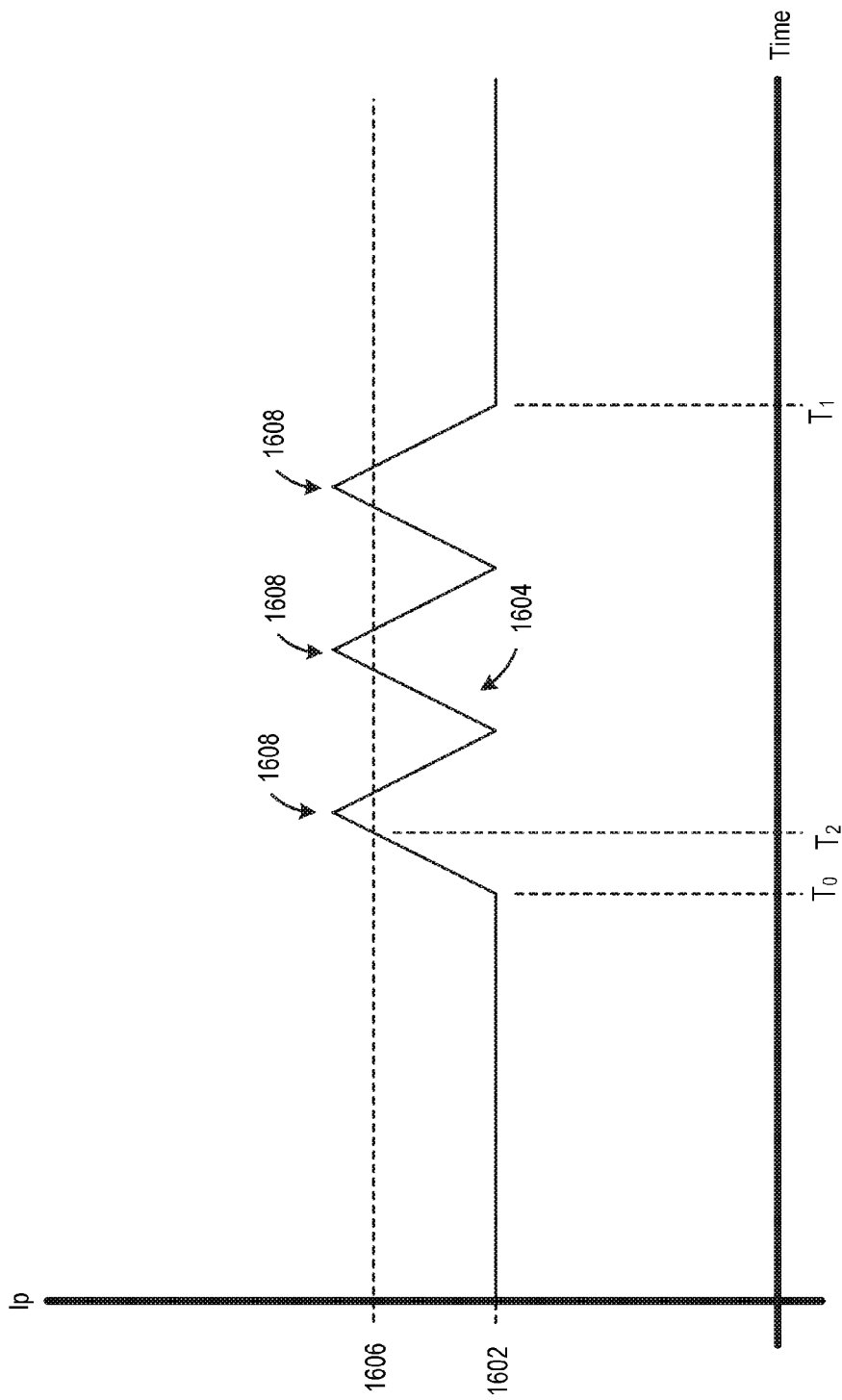
FIG. 16 illustrates one example of the FIG. 15 photovoltaic system transmitting information across a power line via a triangle wave generated by the inverter, according to an embodiment.

FIG. 16 illustrates one example of system 1600 transmitting information across power line 106 via a triangle wave generated by inverter 1604. Prior to time $T_0$, current Ip flowing through power line 106 has value 1602 which is, for example, a maximum power point current of photovoltaic device 102. At time $T_0$, second communication controller 110 causes switching devices in first switching circuit 1508 to switch such that current Ip has a triangle wave 1604 shape until time $T_1$. Current sensing module 412 of first communication controller 408 generates current signal 418 representing current Ip. Detecting module 414 detects current Ip rising above a threshold value 1606 at time $T_2$, and in response, detecting module 414 asserts change signal 420. Decoding module 416 then decodes triangle wave 1604, such as based on the number, frequency, and/or pattern of peaks 1608 in the triangle wave, to obtain information 122, in response to assertion of change signal 420.

Figure 17:
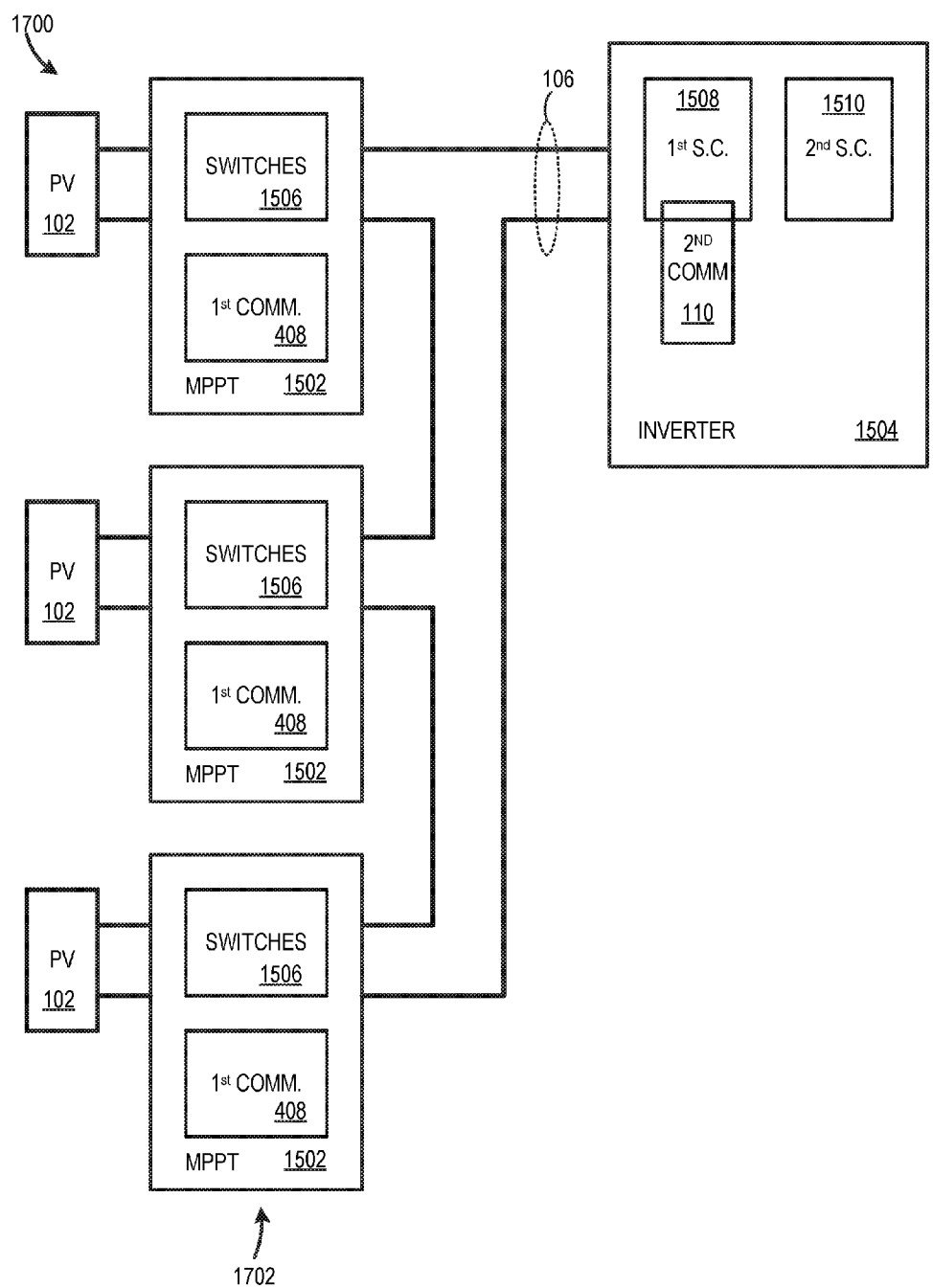
FIG. 17 illustrates a photovoltaic system which is similar to the FIG. 15 photovoltaic system, but including multiple MPPT controllers with their outputs electrically coupled in series to form a string, according to an embodiment.

It is anticipated that some photovoltaic systems will include multiple instances of first communication controller 108, 408, 608, 808, or 1008 and/or second communication controller 110, 610, or 1010, to allow for communication between more than two points. For example, FIG. 17 illustrates a photovoltaic system 1700, which is similar to photovoltaic system 1500 of FIG. 15, but including multiple MPPT controllers 1502 with their outputs electrically coupled in series to form a string 1702. String 1702 is electrically coupled to inverter 1504 via power line 106. Each MPPT controller 1502 is electrically coupled between a respective photovoltaic device 102 and power line 106. A first communication controller 408 is incorporated in each MPPT controller 1502, and therefore, second communication controller 110 in inverter 1504 is capable of communicating with each MPPT controller 1502 over power line 106. The number of strings 1702 and the number of MPPT controllers 1502 within each string 1702 may be varied without departing from the scope hereof.

Furthermore, any of the photovoltaic systems discussed above could be modified to support bidirectional communication over a power line. For example, in another alternate embodiment of photovoltaic system 100, a first communication controller 108 and a second communication controller 110 are co-packaged with photovoltaic device 102, and a first communication controller 108 and a second communication controller 110 are co-packaged with load 104. These dual instances of first communication controller 108 and second communication controller 110 enable two-way communication between photovoltaic device 102 and load 104 via power line 106.

Figure 18:
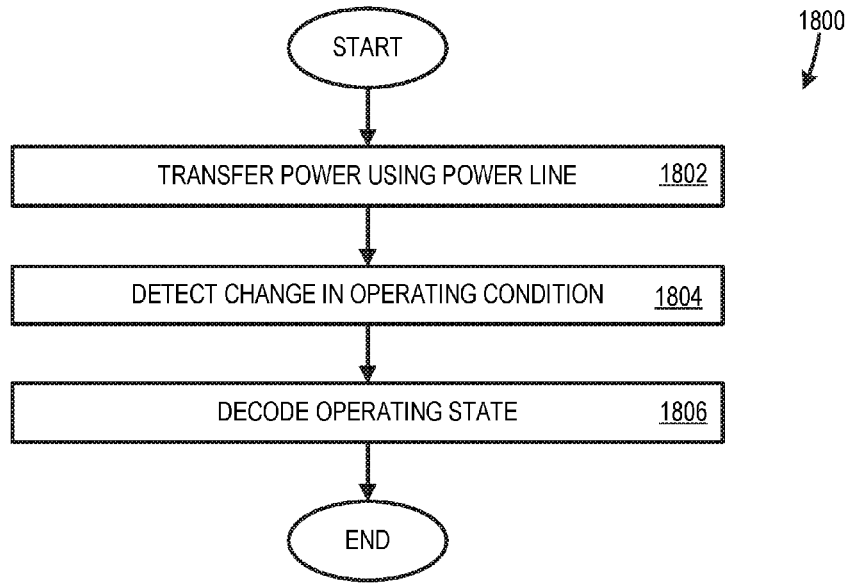
FIG. 18 illustrates a method for DC power line communication in a photovoltaic system, according to an embodiment.

FIG. 18 illustrates a method 1600 for DC power line communication in a photovoltaic system. In step 1802, power is transferred between a photovoltaic device and a load using a power line. In one example of step 1802, power is transferred between photovoltaic device 102 and load 104 using power line 106. (See FIG. 1). In step 1804, a change in operation of the power line is detected. In one example of step 1804, detecting module 116 detects voltage Vp on power line 106 dropping below a threshold value. In step 1806, operating state of the power line is decoded to obtain information, such as by decoding one or more pulses on the power line, in response to the detected change in operation of the power line. In one example of step 1806, decoding module 116 decodes data pulses 308 and 310 on power line 106 to obtain information 122. (See FIGS. 1 and 3).

Figure 19:
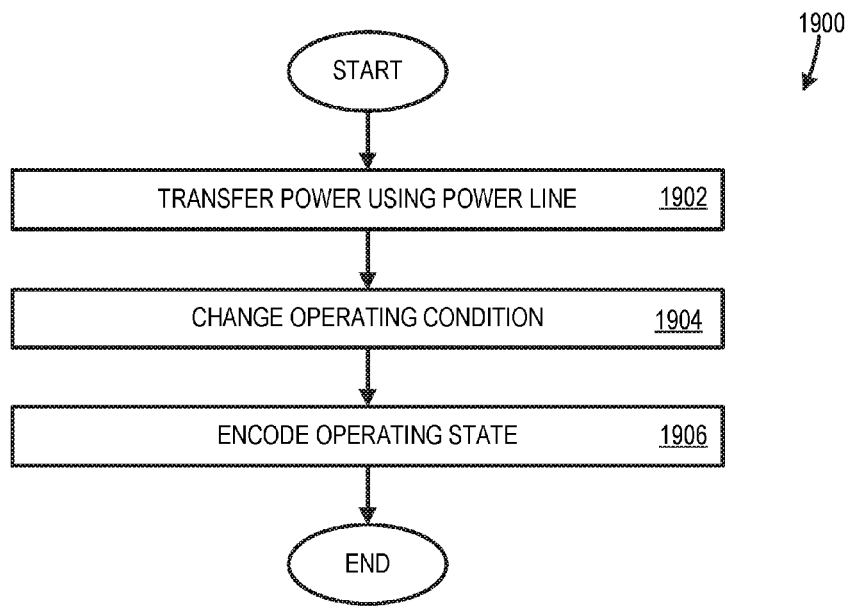
FIG. 19 illustrates another method for DC power line communication in a photovoltaic system, according to an embodiment.

FIG. 19 illustrates a method 1900 for DC power line communication in a photovoltaic system. In step 1902, power is transferred between a photovoltaic device and a load using a power line. In one example of step 1902, power is transferred between photovoltaic device 102 and load 104 using power line 106. (See FIG. 1). In step 1904, operation of the power line is changed. In one example of step 1904, pulse control module 124 causes switching device 126 to switch from its non-conductive state to its conductive state. In step 1906, operating state of the power line is encoded to represent information to be communicated, such as by generating one or more pulses on the power line to represent the information. In one example of step 1906, pulse control module 124 causes switching device 126 to switch between its conductive and non-conductive states several times to generate pulses 304-314. (See FIGS. 1 and 3).

Combinations of Features

Features described above may be combined in various ways without departing from the scope hereof. The following examples illustrate some possible combinations:

(A1) A method for direct current (DC) power line communication in a photovoltaic system may include (1) transferring power between a photovoltaic device and a load using a power line, (2) detecting a change in operation of the power line, and (3) in response to the detected change in operation of the power line, decoding operating state of the power line to obtain information.

(A2) In the method denoted as (A1), the step of detecting the change in operation of the power line may include at least one of (1) detecting magnitude of a DC component of a voltage on the power line dropping below a first threshold value and (2) detecting magnitude of a DC component of a current flowing through the power line rising above a second threshold value.

(A3) The method denoted as (A2) may further include changing operation of the power line by at least one of (a) causing magnitude of the DC component of the voltage on the power line to drop below the first threshold value and (b) causing magnitude of the DC component of the current flowing through the power line to rise above the second threshold value.

(A4) In the method denoted as (A3), the step of changing operation of the power line may further include at least one of (a) shunting the power line and (b) increasing current drawn by the load.

(A5) In the method denoted as (A1), the step of detecting the change in operation of the power line may include at least one of (1) detecting magnitude of a DC component of a voltage on the power line rising above a first threshold value and (2) detecting magnitude of a DC component of a current flowing through the power line falling below a second threshold value.

(A6) The method denoted as (A5) may further include changing operation of the power line by performing at least one of (1) causing magnitude of the DC component of the voltage on the power line to rise above the first threshold value and (2) causing magnitude of the DC component of the current flowing through the power line to fall below the second threshold value.

(A7) In the method denoted as (A6), the step of changing operation of the power line may further include at least one of (1) impeding flow of current through the power line and (2) decreasing current drawn by the load.

(A8) In the method denoted as (A1), the step of detecting the change in operation of the power line may include detecting magnitude of power flowing through the power line dropping below a threshold value.

(A9) The method denoted as (A8) may further include changing operation of the power line by reducing power drawn by the load.

(A10) In the method denoted as (A1), the step of detecting the change in operation of the power line may include detecting power flowing from the load to the photovoltaic device.

(A11) The method denoted as (A10) may further include changing operation of the power line by performing at least one of (1) injecting current into the power line and (2) raising a voltage on the power line.

(A12) In the method denoted as (A1), the step of detecting the change in operation of the power line may include detecting a change in polarity of a DC component of a current flowing through the power line.

(A13) The method denoted as (A12) may further include changing operation of the power line by performing at least one of (1) injecting current into the power line and (2) raising a voltage on the power line.

(A14) In any of the methods denoted as (A1) through (A13), the step of detecting the change in operation of the power line may include detecting persistence of the change in operation for at least a minimum predetermined time period.

(A15) In any of the methods denoted as (A1) through (A14), the step of detecting the change in operation of the power line may include detecting a predetermined pattern of the change in operation.

(A16) In any of the methods denoted as (A1) through (A15), the step of detecting the change in operation of the power line may include detecting a frequency of the change in operation.

(A17) In any of the methods denoted as (A1) through (A16), the step of decoding operating state of the power line may include at least one of (1) decoding a single change in operating state of the power line to obtain the information and (2) decoding a sequence of changes in operating state of the power line to obtain the information.

(A18) Any of the methods denoted as (A1) through (A17) may further include encoding operating state of the power line to represent the information, by performing at least one (1) changing magnitude of a DC component of a voltage on the power line, (2) changing magnitude of a DC component of a current flowing through the power line.

(A19) In the method denoted as (A18), the step of encoding may further include generating one or more pulses on the power line.

(A20) Any of the methods denoted as (A1) through (A17) may further include encoding operating state of the power line to represent the information, by changing polarity of a DC component of a current flowing through the power line.

(A21) In any of the methods denoted as (A1) through (A20), the steps of detecting and decoding may be performed by a communication controller co-packaged with the photovoltaic device.

(A22) In the method denoted as (A21), the information may include a disable command, and the method may further include reducing availability of power from the photovoltaic device to the power line in response to decoding the operating state of the power line to obtain the disable command.

(A23) In the method denoted as (A22), the step of reducing availability of power from the photovoltaic device to the power line may include controlling a switching circuit electrically coupled between the photovoltaic device and the power line, in a manner which reduces availability of power from the photovoltaic device at the power line.

(A24) In the method denoted as (A23), the switching circuit may have a topology selected from the group consisting of a buck-type topology, a boost-type-topology, and a buck-boost-type topology.

(A25) In the method denoted as (A22), the step of reducing availability of power from the photovoltaic device to the power line may include shorting the photovoltaic device or disconnecting the photovoltaic device from the power line.

(A26) In the method denoted as (A21), the information may include an enable command, and the method may further include increasing availability of power from the photovoltaic device to the power line in response to decoding the operating state of the power line to obtain the enable command.

(A27) In any of the methods denoted as (A1) through (A20), the steps of detecting and decoding may be performed by a communication controller that is part of a maximum power point tracking controller electrically coupled between the photovoltaic device and the power line, and the step of transferring power between the photovoltaic device and the load including causing a switching device of the maximum power point tracking controller to repeatedly switch between its conductive and non-conductive states in a manner which maximizes power transferred from the photovoltaic device to the load.

(A28) The method denoted as (A27) may further include changing an operating state of the maximum power point tracking controller in response to the information obtained in the step of decoding.

(A29) In any of the methods denoted as (A1) through (A20), the steps of detecting and decoding may be performed by a communication controller co-packaged with the load.

(A30) In the method denoted as (A29), the information may include information representing status of the photovoltaic device.

(A31) In either of the methods denoted as (A29) or (A30), the load may include an inverter for transforming power from the photovoltaic device to alternating current power, and the communication controller may be part of the inverter.

(A32) In any of the methods denoted as (A1) through (A20), the steps of detecting and decoding may be performed by a communication controller electrically coupled to the power line at a location remote from the photovoltaic device and the load.

(B1) A method for direct current (DC) power line communication in a photovoltaic system may include (1) transferring power between a photovoltaic device and a load using a power line, (2) changing operation of the power line, and (3) encoding operating state of the power line to represent information to be communicated.

(B2) In the method denoted as (B1), the step of changing operation of the power line may include at least one (1) causing magnitude of a DC component of a voltage on the power line to drop below a first threshold value and (2) causing magnitude of a DC component of a current flowing through the power line to rise above a second threshold value.

(B3) In the method denoted as (B2), the step of changing operation of the power line may further include at least one of (1) shunting the power line and (2) increasing current drawn by the load.

(B4) In the method denoted as (B1), the step of changing operation of the power line may include at least one (a) causing magnitude of a DC component of a voltage on the power line to rise above a first threshold value and (b) causing magnitude of a DC component of a current flowing through the power line to fall below a second threshold value.

(B5) In the method denoted as (B4), the step of changing operation of the power line may further include at least one of (1) impeding flow of current through the power line and (2) decreasing current drawn by the load.

(B6) In the method denoted as (B1), the step of changing operation of the power line may include decreasing power drawn by the load below a threshold value.

(B7) In the method denoted as (B1), the step of changing operation of the power line may include transferring power from the load to the photovoltaic device.

(B8) In the method denoted as (B7), the step of changing operation of the power line may further include at least one of (1) injecting current into the power line and (2) raising a voltage on the power line.

(B9) In the method denoted as (B1), the step of changing operation of the power line may include changing polarity of a DC component of a current flowing through the power line.

(B10) In the method of (B9), the step of changing operation of the power line may further include at least one of (a) injecting current into the power line and (b) raising a voltage on the power line.

(B11) In any of the methods denoted as (B1) through (B10), the step of changing operation of the power line may include changing operation of the power line for at least a minimum predetermined time period.

(B12) In any of the methods denoted as (B1) through (B11), the step of changing operation of the power line may include changing operation of the power line according to a predetermined pattern.

(B13) In any of the methods denoted as (B1) through (B12), the step of changing operation of the power line may include changing operation of the power line at a predetermined frequency.

(B14) In any of the methods denoted as (B1) through (B13), the step of encoding operating state of the power line may include at least one (1) changing magnitude of a DC component of a voltage on the power line and (2) changing magnitude of a DC component of a current flowing through the power line.

(B15) In the method denoted as (B14), the step of encoding operating state of the power line may further include generating one or more pulses on the power line.

(B16) In any of the methods denoted as (B1) through (B13), the step of encoding operating state of the power line may include changing polarity of a DC component of a current flowing through the power line.

(B17) In any of the methods denoted as (B1) through (B16), the steps of changing and encoding may be performed by a communication controller co-packaged with the load.

(B18) In the method denoted as (B17), the load may include an inverter for transforming power from the photovoltaic device to alternating current power, and the communication controller may be part of the inverter.

(B19) In the method denoted as (B18), the step of changing operation of the power line may include at least one of (1) causing the inverter to raise a voltage on the power line and (2) causing the inverter to inject current into the power line.

(B20) In any of the methods denoted as (B1) through (B19), the information to be communicated may include a command selected from the group consisting of a command to enable availability of power from the photovoltaic device and a command to reduce availability of power from the photovoltaic device.

(B21) In any of the methods denoted as (B1) through (B16), the steps of changing and encoding may be performed by a communication controller co-packaged with the photovoltaic device.

(B22) In the method denoted as (B21), the information to be communicated may include information representing status of the photovoltaic device.

(B23) In any of the methods denoted as (B1) through (B16), the steps of changing and encoding may be performed by a switching circuit electrically coupled between the photovoltaic device and the power line, and the step of changing operation of the power line may include controlling a switching device of the switching circuit.

(B24) In any of the methods denoted as (B1) through (B16), the steps of changing and encoding may be performed by a communication controller electrically coupled to the power line at a location remote from the photovoltaic device and the load.

(C1) A communication controller for direct current (DC) power line communication in a photovoltaic system may include (1) a detecting module configured to detect a change in operation of the power line and (2) a decoding module configured to, in response to the change in operation of the power line detected by the detecting module, decode operating state of the power line to obtain information.

(C2) The communication controller denoted as (C1) may further include a voltage sensing module configured to generate a voltage signal representing voltage on the power line, wherein the detecting module is further configured to monitor the voltage signal and detect the change in operation of the power line in response to the voltage on the power line dropping below or rising above a threshold value.

(C3) The communication controller denoted as (C1) may further include a current sensing module configured to generate a current signal representing current flowing through the power line, wherein the detecting module is further configured to monitor the current signal and detect the change in operation of the power line in response to the current flowing through the power line dropping below or rising above a threshold value.

(C4) The communication controller denoted as (C1) may further include a current sensing module configured to generate a current signal representing current flowing through the power line, wherein the detecting module is further configured to monitor the current signal and detect the change in operation of the power line in response to a change in polarity of the current flowing through the power line.

(C5) The communication controller denoted as (C1) may further include a power sensing module configured to generate a power signal representing power being transmitted through the power line, wherein the detecting module is further configured to monitor the power signal and detect the change in operation of the power line in response to the power flowing through the power line (a) dropping below a first threshold value, (b) rising above a second threshold value, or (c) flowing through the power line from a load to a photovoltaic device.

(D1) A communication controller for direct current (DC) power line communication in a photovoltaic system may include (1) a switching device for electrically coupling to the power line and (2) a pulse control module configured to: (a) cause the switching device to change operating states and thereby change operation of the power line and (b) cause the switching device to switch to encode operating state of the power line to represent information to be communicated.

(E1) An inverter may include any one of the communication controllers denoted as (C1) through (C5) or (D1).

(F1) A photovoltaic system may include (1) the inverter denoted as (E1), (2) a photovoltaic device, and (3) a power line electrically coupling the photovoltaic device to the inverter.

(G1) A photovoltaic system may include (1) a photovoltaic device, (2) an inverter, (3) a power line electrically coupling the photovoltaic device and the inverter, and (4) any one of the communication controllers denoted as (C1) through (C5) electrically coupled to the power line, wherein the inverter is configured to perform at least one of the following steps: (a) raise a voltage on the power line to change operation of the power line, and (b) inject current into the power line to change operation of the power line.

(H1) A photovoltaic system may include (1) a photovoltaic device and (2) any one of the communication controllers denoted as (C1) through (C5) or (D1) electrically coupled to the photovoltaic device.

(H2) In the photovoltaic system denoted as (H1), the communication controller of the photovoltaic system may be part of a maximum power point tracking controller electrically coupled to the photovoltaic device.

(H3) In the photovoltaic system denoted as (H1), the communication controller of the photovoltaic system may be co-packed with the photovoltaic device.

(H4) The photovoltaic system denoted as (H1) may further include (1) a load and (2) a power line electrically coupling the photovoltaic device to the load, where the communication controller of the photovoltaic system is electrically coupled to the power line.

Changes may be made in the above methods, devices, and systems without departing from the scope hereof. It should thus be noted that the matter contained in the above description and shown in the accompanying drawings should be interpreted as illustrative and not in a limiting sense. The following claims are intended to cover generic and specific features described herein, as well as all statements of the scope of the present method and system, which, as a matter of language, might be said to fall therebetween.

What is claimed is:

1. A method for direct current (DC) power line communication in a photovoltaic system, comprising:
    transferring power between a photovoltaic device and a load using a power line;
    receiving information to be communicated;
    in response to receiving the information to be communicated, changing operation of the power line to cause the power line to operate outside of a predetermined normal operating range of the power line, to encode the information to be communicated;
    detecting a change in operation of the power line; and
    in response to detecting the change in operation of the power line, decoding operating state of the power line to obtain the information to be communicated,
    the step of detecting the change in operation of the power line comprising at least one of (a) detecting magnitude of a DC component of a voltage on the power line dropping below a first threshold value and (b) detecting magnitude of a DC component of a current flowing through the power line rising above a second threshold value.

2. The method of claim 1, wherein:
    changing operation of the power line comprises at least one of (a) causing magnitude of the DC component of the voltage on the power line to drop below the first threshold value and (b) causing magnitude of the DC component of the current flowing through the power line to rise above the second threshold value; and the predetermined normal operating range of the power line comprises at least one of a predetermined voltage magnitude range of the power line, a predetermined current magnitude range of the power line, a predetermined power magnitude range of the power line, and a predetermined polarity of current flowing through the power line.

3. The method of claim 2, the step of changing operation of the power line further comprising at least one of (a) shunting the power line and (b) increasing current drawn by the load.

4. The method of claim 1, the step of detecting the change in operation of the power line comprising detecting a change in polarity of a DC component of a current flowing through the power line.

5. The method of claim 4, the step of changing operation of the power line comprising at least one of (a) injecting current into the power line and (b) raising a voltage on the power line.

6. The method of claim 1, the step of changing operation of the power line comprising changing polarity of a DC component of a current flowing through the power line.

7. A method for direct current (DC) power line communication in a photovoltaic system, comprising:
   transferring power between a photovoltaic device and a load using a power line;
   receiving information to be communicated;
   in response to receiving the information to be communicated, changing operation of the power line to cause the power line to operate outside of a predetermined normal operating range of the power line, to encode the information to be communicated;
   detecting a change in operation of the power line; and
   in response to detecting the change in operation of the power line, decoding operating state of the power line to obtain the information to be communicated,
   the step of detecting the change in operation of the power line comprising at least one of (a) detecting magnitude of a DC component of a voltage on the power line rising above a first threshold value and (b) detecting magnitude of a DC component of a current flowing through the power line falling below a second threshold value.

8. The method of claim 7, wherein:
   changing operation of the power line comprises performing at least one of (a) causing magnitude of the DC component of the voltage on the power line to rise above the first threshold value and (b) causing magnitude of the DC component of the current flowing through the power line to fall below the second threshold value; and
   the predetermined normal operating range of the power line comprises at least one of a predetermined voltage magnitude range of the power line, a predetermined current magnitude range of the power line, a predetermined power magnitude range of the power line, and a predetermined polarity of current flowing through the power line.

9. The method of claim 8, the step of changing operation of the power line further comprising at least one of (a) impeding flow of current through the power line and (b) decreasing current drawn by the load.

10. The method of claim 7, the step of detecting the change in operation of the power line comprising detecting persistence of the change in operation for at least a minimum predetermined time period.

11. The method of claim 7, the step of detecting the change in operation of the power line comprising detecting a predetermined pattern of the change in operation.

12. The method of claim 7, the step of decoding operating state of the power line comprising at least one of:
   decoding a single change in operating state of the power line to obtain the information; and
   decoding a sequence of changes in operating state of the power line to obtain the information.

13. The method of claim 7, the step of detecting the change in operation of the power line comprising detecting a change in polarity of a DC component of a current flowing through the power line.

14. A method for direct current (DC) power line communication in a photovoltaic system, comprising:
   transferring power between a photovoltaic device and a load using a power line;
   receiving information to be communicated;
   in response to receiving the information to be communicated, changing operation of the power line by performing at least one of (a) changing magnitude of a DC component of a voltage on the power line and (b) changing magnitude of a DC component of a current flowing through the power line, to cause the power line to operate outside of a predetermined normal operating range of the power line and to encode the information to be communicated, the predetermined normal operating range of the power line including at least one of a predetermined voltage magnitude range of the power line, a predetermined current magnitude range of the power line, a predetermined power magnitude range of the power line, and a predetermined polarity of current flowing through the power line;
   detecting a change in operation of the power line; and
   in response to detecting the change in operation of the power line, decoding operating state of the power line to obtain the information to be communicated.

15. The method of claim 14, the step of changing operation of the power line further including generating one or more pulses on the power line.

16. The method of claim 14, the steps of detecting and decoding being performed by a communication controller co-packaged with the photovoltaic device.

17. The method of claim 16, the information to be communicated including a disable command, and the method further comprising reducing availability of power from the photovoltaic device to the power line in response to decoding the operating state of the power line to obtain the disable command.

18. The method of claim 17, the step of reducing availability of power from the photovoltaic device to the power line comprising controlling a switching circuit electrically coupled between the photovoltaic device and the power line, in a manner which reduces availability of power from the photovoltaic device at the power line.

19. The method of claim 17, the step of reducing availability of power from the photovoltaic device to the power line comprising shorting the photovoltaic device or disconnecting the photovoltaic device from the power line.

20. The method of claim 16, the information to be communicated including an enable command, and the method further including increasing availability of power from the photovoltaic device to the power line in response to decoding the operating state of the power line to obtain the enable command.

21. The method of claim 14, the steps of detecting and decoding being performed by a communication controller that is part of a maximum power point tracking controller electrically coupled between the photovoltaic device and the power line, and the step of transferring power between the photovoltaic device and the load including causing a switching device of the maximum power point tracking controller to repeatedly switch between its conductive and non-conductive states in a manner which maximizes power transferred from the photovoltaic device to the load.

22. The method of claim 21, further comprising changing an operating state of the maximum power point tracking controller in response to the information obtained in the step of decoding.

23. The method of claim 14, the step of detecting the change in operation of the power line comprising detecting a change in polarity of a DC component of a current flowing through the power line.

* * * * *